United States Patent [19]
Clifton et al.

[11] Patent Number: 5,905,321
[45] Date of Patent: May 18, 1999

[54] ENERGY STORAGE FLYWHEEL APPARATUS AND METHODS

[75] Inventors: David B. Clifton, Leander; Joseph F. Pinkerton, Austin; James A. Andrews, Austin; Scott R. Little, Austin, all of Tex.

[73] Assignee: Active Power, Inc., Austin, Tex.

[21] Appl. No.: 09/024,750

[22] Filed: Feb. 17, 1998

Related U.S. Application Data

[62] Division of application No. 08/597,008, Feb. 5, 1996, Pat. No. 5,731,645.

[51] Int. Cl.$^6$ ............................. H02K 7/01; H02K 21/20
[52] U.S. Cl. .......................... 310/178; 310/113; 310/74; 310/268; 310/261
[58] Field of Search ............................. 310/74, 178, 113, 310/268, 171, 168; 74/572

[56] References Cited

U.S. PATENT DOCUMENTS

| | | | |
|---|---|---|---|
| 3,304,450 | 2/1967 | Bosco, Jr. et al. | 310/126 |
| 3,493,800 | 2/1970 | Barrett | 310/162 |
| 4,075,519 | 2/1978 | Mrcun | 310/67 R |
| 4,077,678 | 3/1978 | Studer et al. | 310/90.5 |
| 4,136,296 | 1/1979 | Hickey | 310/269 |
| 4,159,434 | 6/1979 | Kalsi | 310/178 |
| 4,211,452 | 7/1980 | Poubeau | 310/178 |
| 4,366,405 | 12/1982 | Schmider | 310/268 |
| 4,385,251 | 5/1983 | Mallick et al. | 310/178 |
| 4,412,170 | 10/1983 | Roesel | 322/4 |
| 4,444,444 | 4/1984 | Benedetti et al. | 310/90.5 |
| 4,460,834 | 7/1984 | Gottfried | 310/178 |
| 4,611,139 | 9/1986 | Godkin et al. | 310/266 |
| 4,620,752 | 11/1986 | Fremerey et al. | 310/90.5 |
| 4,647,806 | 3/1987 | Giuffrida | 310/68 D |
| 4,649,287 | 3/1987 | Nola | 307/31 |
| 4,654,551 | 3/1987 | Farr et al. | 310/112 |
| 4,707,774 | 11/1987 | Kajita | 363/37 |
| 4,827,152 | 5/1989 | Farkas | 307/68 |
| 5,065,060 | 11/1991 | Takahashi et al. | 310/74 |
| 5,065,484 | 11/1991 | Pinchott | 29/25.02 |
| 5,097,169 | 3/1992 | Fukushima | 310/268 |
| 5,130,593 | 7/1992 | Connell | 310/256 |
| 5,210,452 | 5/1993 | Pratap et al. | 310/12 |
| 5,315,197 | 5/1994 | Meeks et al. | 310/90.5 |
| 5,347,191 | 9/1994 | Wood | 310/113 |
| 5,434,463 | 7/1995 | Horski | 310/248 |
| 5,646,458 | 7/1997 | Bowyer et al. | 307/67 |

FOREIGN PATENT DOCUMENTS

| | | |
|---|---|---|
| 31 13 532 | 11/1982 | Germany . |
| 61-164442 | 7/1986 | Japan . |

OTHER PUBLICATIONS

Rinehart, R.E., "A Flywheel Energy Storage Propulsion System for Intra Urban Buses," *1980 Flywheel Technology Symposium*, Oct., 1980, Scottsdale, Arizona, pp. 145 to 149.

Bauer, W.H. and Brobeck, W.M., "Flywheel Bearing Design for Automotive Applications," *1980 Flywheel Technology Symposium*, Oct., 1980, Scottsdale, Arizona, pp. 371 to 379.

*Primary Examiner*—Nestor Ramirez
*Assistant Examiner*—Karl I. E. Tamai
*Attorney, Agent, or Firm*—Fish & Neave; Robert W. Morris

[57] ABSTRACT

A flywheel energy conversion device provides highly efficient conversion between kinetic and electrical energy. The flywheel produces increased output by providing armature coils in an air gap formed about the flywheel (both radial and axial embodiments are described). In preferred embodiments, field coils of a magnetic circuit are energized with DC drive current that creates homopolar flux within a rotating solid rotor having teeth cut from a flat disk. The total reluctance of the magnetic circuit and total flux remain substantially constant as the rotor rotates. The flux may travel radially outward and exit the flat disk through the teeth passing across an armature air gap. Airgap armature coils are preferably utilized in which the changing flux density (due to the rotating teeth) induces an output voltage in the coils. The flux is diffused before returning to the rotor in one of several ways such that core losses are effectively reduced, thereby enabling the flywheel to operate efficiently at high frequencies.

24 Claims, 15 Drawing Sheets

ENERGY STORAGE FLYWHEEL APPARATUS AND METHODS

CROSS-REFERENCE TO RELATED APPLICATION

This application is a divisional of U.S. patent application Ser. No. 08/597,008, filed Feb. 5, 1996 now U.S. Pat. No. 5,731,645, which is incorporated by reference in its entirety.

BACKGROUND OF THE INVENTION

This invention relates to flywheel energy conversion devices that include motor-generators and methods for providing increased output power, and more particularly toward flywheel energy conversion devices including brushless motor-generators having low inductance armature windings. The armature windings of the present invention are located in an air gap of an unusually high reluctance field circuit including large air gaps in place of traditional armature windings that are enclosed in the high permeability parts of a lower reluctance field circuit.

One area where flywheel energy storage devices may prove advantageous is in situations requiring a continuous supply of reserve power in the event of a primary power source failure (i.e., failure by a utility company supply). In such situations, it is often required that a secondary power source supply a nominal amount of power for a certain time period so that various pieces of equipment utilizing primary power may be shut down in a relatively normal fashion, rather than the instantaneous shut down that would occur from a loss of primary power without a backup supply. A traditional approach to resolving this problem is the use of a bank of chemical batteries, often combined with an emergency generator.

For example, in a paper mill, substantially liquid paper pulp is sprayed onto a rotating wire mesh and then carried through a long series of rollers through ovens to remove the moisture from the pulp. It may take several minutes for the liquid pulp to pass through all of the ovens before the pulp has dried and reached the end of the line where it is rolled up onto high speed spools. An instantaneous loss of power under such circumstances would be catastrophic. Therefore, paper mills often have one or more large rooms filled with chemical batteries to provide backup power to keep all of the equipment running while the pulp supply is shut off and the remainder of the pulp already on the production line is processed.

Chemical batteries, however, suffer from various deficiencies including bulkiness, lack of reliability, limited lifespan, high maintenance costs and relatively low safety. For example, chemical batteries require relatively constant and complex recharging, depending on the type of batteries involved to insure that the batteries continue to operate efficiently and maintain their full storage capacity. Additionally, chemical batteries raise various safety considerations due to the general nature of the large quantities of caustic chemicals involved. Typical large battery installations often require special venting and air-conditioning systems for the dedicated battery storage rooms.

In order to provide an efficient replacement for chemical batteries, flywheel energy storage devices must operate at high levels of energy conversion efficiency. Thus, flywheel devices are often designed to operate in a vacuum so as to minimize the energy losses due to air drag friction (e.g., see Benedetti et al. U.S. Pat. No. 4,444,444). The vacuum condition demands that heat generation in the rotating components be minimized because rotor heat in a vacuum can only be dissipated by radiation or conduction through bearing surfaces which are small and have limited heat conducting capacity. In addition, brushes used to transfer current between stationary components and rotating components in vacuum conditions are subject to more destructive arcing than brushes operating in air. This essentially limits the energy storage device to brushless operation because brushes tend to exhibit extremely short lifespans when operated in vacuum conditions. The use of brushless motor-generators in flywheel storage devices is complicated, however, by the fact that brushless motor-generators typically utilize heat generating components such as rotating rectifier assemblies and rotating coils, as described below.

The use of brushless generators is well known throughout various industries. For example, automobile manufacturers often utilize brushless generators to provide electrical power to vehicles. Prior brushless generators suffer from a variety of problems that make them poor candidates for use with flywheel energy storage devices. Many of these prior generators utilize bent-over teeth as magnetic fingers in the rotor assembly. For example, Godkin et al. U.S. Pat. No. 4,611,139 and Farr U.S. Pat. No. 4,654,551 both disclose brushless alternators that include magnetic bent-over fingers to produce varying magnetic flux in the stator core. The bent-over teeth in these devices are simply inappropriate for flywheel applications because the high speeds at which the tip of the flywheel must rotate would cause high stress concentrations at the bend in the teeth which severely compromise operational safety. To maintain safe operations in view of the high stress concentrations, known flywheel devices often operate at lower rotational speeds that, unfortunately, result in less stored energy for a given volume.

Another kind of brushless generator operates by applying a small input signal to an exciter winding that induces a much larger signal in a rotating member. The input signal, which may be a DC current or a low frequency AC current, causes an AC current to be induced in the rotating member. The AC current is then converted to DC by a rectifier assembly typically located within the rotating member, as is known in the art (e.g., see Pinchott U.S. Pat. No. 5,065,484). The rectified DC current flows through the main windings (on the rotating member) and creates a large rotating magnetic field. The rotating field interacts with the main armature to generate a large AC signal in the armature windings. This large AC signal, which is delivered to the external load, may be effectively 10,000 times greater than the signal that was input to the exciter.

In some instances, the exciter may itself be excited by a permanent magnet generator (PMG). One known example of an alternator which utilizes PMGs is described in Farr U.S. Pat. No. 4,654,551. Farr's magnetic flux field is generated by a rotating permanent magnet ring and a toroidal control coil, where the toroidal control coil is mounted to add or subtract in the magnetic relationship with the ring. Farr, however, may experience potentially severe core losses due to the nature of the stationary iron core armature device.

As with most known electromagnetic devices, many brushless generators are typically manufactured using iron cores in both the exciter and main armatures. For example, Giuffrida U.S. Pat. No. 4,647,806 describes a brushless alternator having an exciter armature formed from a laminated stack of steel plates, and Mallick et al. U.S. Pat. No. 4,385,251 describes an inductor-alternator having armature coils wound around slots cut into laminated stack stators. While both Giuffrida and Mallick described improvements over known devices at the time, both patents represent machines that, unfortunately, produce various energy losses (e.g., core losses) and have high armature inductances resulting in limited power density.

Another necessary consideration in designing flywheel devices relates to the negative effects of weight of the rotor. The weight of the rotor is particularly relevant in energy storage applications—flywheel rotors typically weigh hundreds of pounds—because the rotor must rotate at exceedingly high speeds in order to store kinetic energy. As such, the mechanical bearings supporting the rotor are often placed under high stress resulting in rapid bearing wear.

One known method for addressing bearing wear in flywheel applications is the replacement of the conventional bearings with magnetic bearings. For example, Benedetti et al. U.S. Pat. No. 4,444,444 describes a magnetically suspended flywheel that employs a double electromagnet and a servoloop for restoring equilibrium to a levitated rotating member. The electromagnets, which are attached to a stationary shaft, interact with permanent magnets and a mobile armature attached to the rotating member to provide a magnetic attraction "equal to the force of gravity" acting on the mass of the rotor. Such a solution is relatively complex, requiring the attachment of several additional components to the stationary and rotating parts of the device.

Additionally, applications such as Benedetti often require "air-core" armature coils because an iron core armature would cause magnetic instability by competing with the stabilizing magnetic forces of the magnetic bearing. However, such devices also require a very large volume of expensive permanent magnet material for the rotating member that is often structurally complex to implement (e.g., Benedetti's armature calls for twelve rotating magnets having successively opposite poles fixed about at least one of two rings). Further, implementations such as Benedetti essentially have limited output power due to physical considerations (Benedetti discusses a practical embodiment in which a 370 kg rotor provides up to 10 kw of power).

Another consideration that must be accounted for when implementing electrical machines is the negative effects of eddy currents in the unlaminated materials frequently used as part of the flux carrying magnetic circuit. For example, Mallick et al. U.S. Pat. No. 4,385,251 provides a flux shield in the form of, for example, a conducting ring concentric with the rotor, to help prevent time varying fluxes from inducing eddy currents in the rotor steel and unlaminated back iron because such eddy currents lead to performance losses in the machine. However, Mallick also notes that eddy currents are induced in the flux shields resulting in losses, but indicates that the losses are reduced when compared to machines without the flux shield.

In view of the foregoing, it is an object of this invention to provide an improved flywheel energy conversion device that efficiently provides high output power, including a compact design resulting in a high power density.

It is also an object of the present invention to provide an improved flywheel energy conversion device that includes a brushless generator for use in vacuum conditions, where a minimum of power is dissipated in the rotating frame.

It is a further object of the present invention to provide an improved flywheel energy conversion device that may be safely operated at substantially high rpm.

It is an additional object of the present invention to provide methods and apparatus for reducing the effects of core losses on high speed flywheel energy storage devices.

It is a still further object of the present invention to provide improved flywheel energy conversion devices that may be produced at low costs when compared to currently known technologies.

SUMMARY OF THE INVENTION

These and other objects of the invention are accomplished in accordance with the principles of the invention by providing various flywheel energy conversion devices. The preferred embodiments include a brushless generator having its armature coils located in an air gap in place of the traditional ferrous armature core. The energy storage devices also include at least one stationary annular field coil that, in conjunction with a rotating toothed-rotor and a stationary laminated ring, produces flux having varying flux density (due to the gaps between the teeth on the rotor). Airgap coils provide reduced inductance (because the coils are radially thin) that permits faster current rise times and thus, higher power at the high frequencies that are typical of flywheel devices. Inductance is also reduced from the flux compression that occurs because the solid rotor teeth are very close to the airgap coils, and because the field circuit has relatively large air gaps.

A further advantage of the present invention is related to the smooth laminated ring that provides a site for flux diffusion that greatly reduces changing flux in the rotor and unlaminated stationary parts, thereby reducing core losses. The armature coils are located on the surface of the smooth laminated ring so that the coils fully link the changing flux before any flux diffusion takes place. The use of airgap armature coils enables the energy storage device to be produced in a substantially compact manner while efficiently producing high output power.

In various preferred embodiments, an annular field coil is disposed above and below the rotor (i.e., two annular fields coils are used) that produce airgap flux traveling radially outward from the axis of the rotor. In these embodiments, the solid disk design of the rotor enables the flywheel devices of the present invention to store more inertial energy than any design consisting of a similarly sized rotor utilizing a disk mounted on a shaft inserted through a hole bored into the disk, or any design using an annular rim joined to a shaft by radially oriented spokes. This is due, at least in part, to the fact that the maximum hoop stress in a solid disk, which limits the flywheel's maximum angular velocity and hence its maximum kinetic energy, is at most only one-half the maximum hoop stress of an annular design for a given diameter, rpm and material, provided the material is homogenous. This principle is also applicable to other embodiments of the present invention where a solid, unitary piece of metal is formed into a disk having an extended shaft-like lower portion.

In the dual field coil embodiments, the flux, upon reaching the rotor protrusions, passes through the stationary armature coils, then through one or two laminated rings (i.e., a single ring or, one upper ring and one lower ring) before entering the solid steel outer shell of the device. The outer shell directs the flux radially inward where it passes through an axial gap back into the rotor. The field coil is driven by a substantially DC current that produces a total flux density proportional to the current. The use of DC enables the flux to be produced with substantially no hysteresis or eddy current losses in the rotor. Depending on the desired performance parameters, the outer shell may be formed of upper and lower rings separated by a non-magnetic ring (such that no flux travels vertically through the shell), or it may be formed of upper and lower shells, two axially polarized annular permanent magnets and an annular ring (as is described in more detail below).

Another preferred embodiment includes a single stationary annular field coil located on one side of the toothed portion of a rotor (while the single field coil is shown in the figures to be below the rotor, persons skilled in the art will appreciate that the field coil may instead, be located above the rotor). Extending radially from the rotor protrusions are airgap armature coils, a stationary laminated ring and a unitary steel shell. Similar to the above-described operation, a substantially DC current is applied to the field coil that produces flux. In this instance, the flux travels axially through the rotor shaft until it reaches the toothed portion of the rotor, at which point the flux begins traveling radially. The flux traverses the armature air gap, passing through the airgap armature coils, and then passes through the laminated ring and enters the steel shell. The steel shell directs the flux first axially, then radially back toward the shaft portion of the rotor. This embodiment may also be varied with the addition of permanent magnets, either radially polarized or axially polarized, depending on the installation location.

Further features of the invention, its nature and various advantages will be more apparent from the accompanying drawings and the following detailed description of the preferred embodiments.

DETAILED DESCRIPTION OF THE PREFERRED EMBODIMENTS

Figure 1:
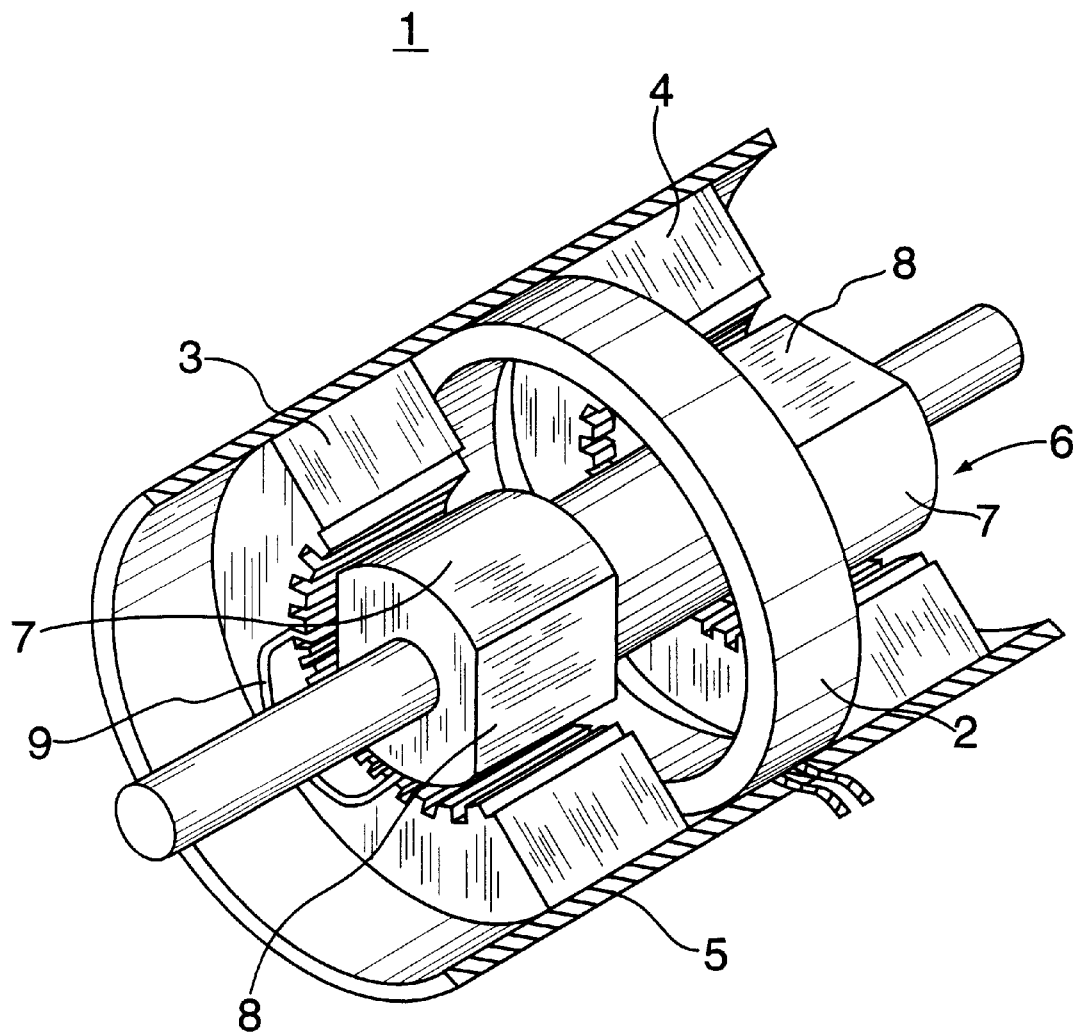
FIG. 1 is a cutaway perspective view of a conventional homopolar inductor-alternator.

FIG. 1 shows a conventional homopolar inductor-alternator machine 1. Machine 1 includes a stationary field coil 2 positioned between two stationary lamination stacks 3 and 4. Lamination stacks 3 and 4 have inner surface axial slots that armature windings 9 are mounted within. An outer shell 5 (or back iron) that is typically a substantially solid piece of steel surrounds the stator assembly and provides a flux return path as is described below. Mounted within shell 5 is a rotor 6 that rotates freely. Rotor 6 has poles extending radially at each end of the rotor, such that the poles 7 rotate within lamination stacks 3 and 4. As shown in FIG. 1, the poles may be oriented such that they are offset by 180 degrees.

Machine 1 is operated by applying a direct current to field coil 2. The current drives a homopolar magnetic flux through one of lamination stacks 3 and 4 and into the corresponding poles of rotor 6. The magnetic flux is said to be homopolar because there are no flux reversals in individual laminated stacks 3 and 4 as rotor 6 rotates within shell 5. Upon entering the rotor 6, the flux travels axially through the rotor 6 until the other set of poles is reached. The flux then travels across the air gap between the rotating poles and into the other one of lamination stacks 3 and 4. After passing through the other lamination stack, the flux completes the magnetic circuit by traveling through shell 5 until it completes a full closed loop. It should be noted that there are large magnetic slots 8 between the poles 7 of rotor 6. These slots interrupt the flow of the flux at the air gap causing the flux therein to vary with time. The time varying flux generates an AC voltage in the armature windings 9.

Figure 2:
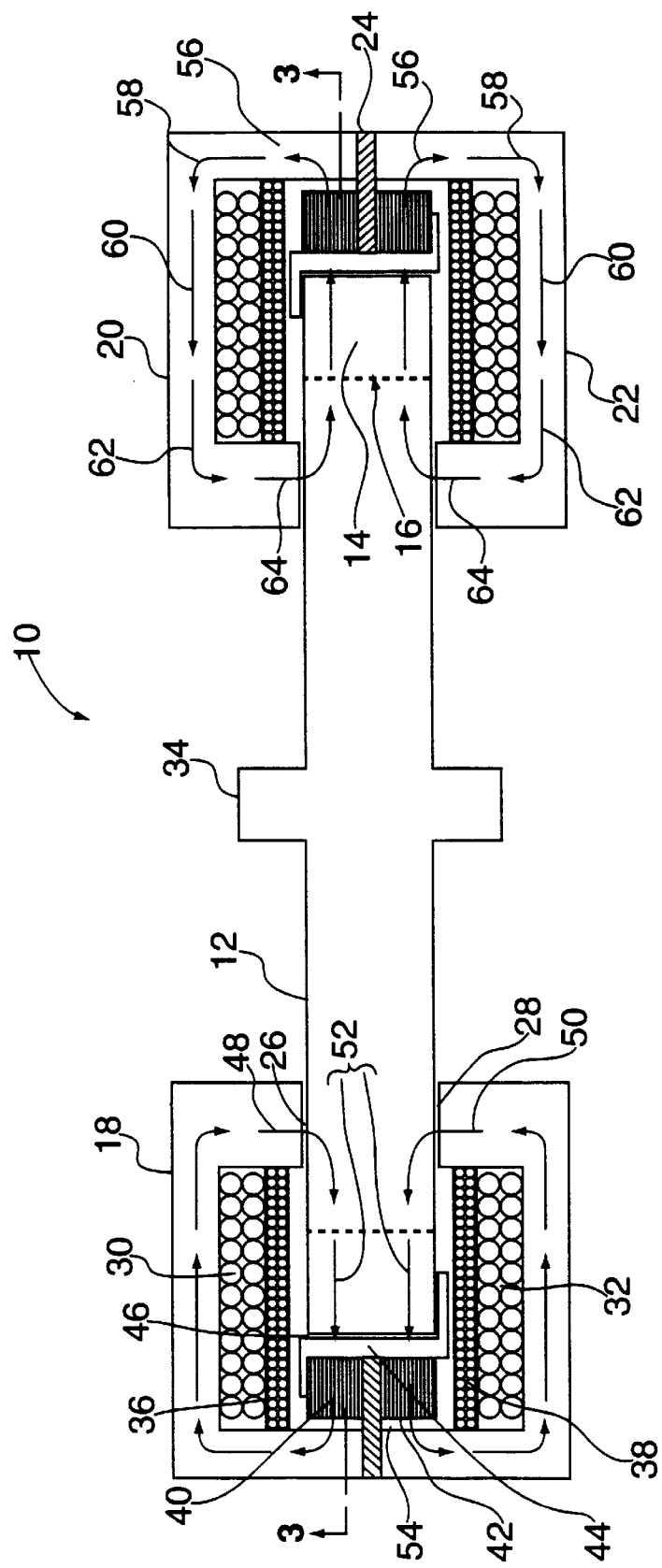
FIG. 2 is a longitudinal cross-sectional view of a preferred embodiment of a flywheel energy conversion device constructed in accordance with the principles of the present invention.
Figure 3:
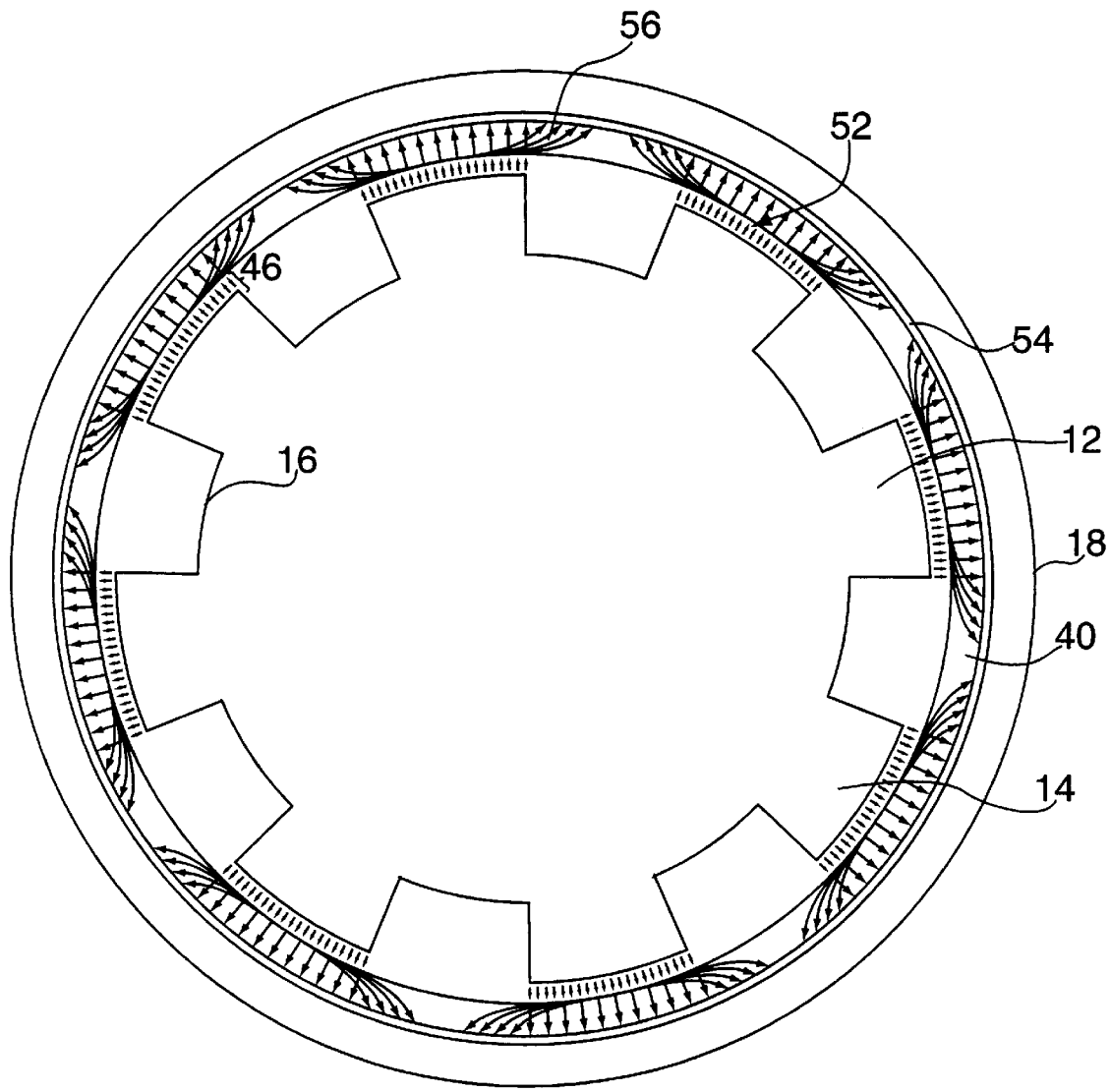
FIG. 3 is a cross-sectional top view of the flywheel energy conversion device of FIG. 2, taken from line 3—3 of FIG. 2.

Referring to FIG. 2, a preferred embodiment of a flywheel energy conversion device 10 in accordance with the principles of the present invention is described. Flywheel device 10 includes a substantially planar disk rotor 12 having a series of substantially similar teeth 14 (i.e., protrusions) cut out around the circumference of the disk (as indicated by hidden line 16—FIG. 3 shows a top view of the rotor 12) located within a shell 18. Shell 18 is preferably formed from substantially high permeability material such as steel. Shell 18 includes an upper shell 20, a lower shell 22 and an annular insert of non-magnetic material 24 located therebetween. While the "split" shell shown may be used for shell 18, persons skilled in the art will appreciate that shell 18 may also be formed from two pieces of high permeability material without the non-magnetic insert to form a "single" shell. The differences between the two methods will be apparent from the discussion that follows. In either configuration (i.e., split shell or single shell), a pair of axial air gaps 26 and 28 are formed between shell 18 and rotor 12.

Rotor 12 is preferably formed with a shaft 34 (for mounting the rotor on bearings (not shown)) from a single piece of high permeability material such as steel. The use of a unitary rotor (with no center hole), while requiring additional weight, provides flywheel device 10 with significantly improved safety and performance characteristics (due to the relative simplicity of construction and the increased safe speed of rotation resulting in higher energy density). Mounted within shell 18 are upper annular field coil 30 and lower annular field coil 32, both of which remain stationary with respect to the rotor. Field coils 30 and 32 are preferably configured such that teeth 14 of rotor 12 pass completely between the coils (e.g., the radial length of each tooth 14 is less than the radial length of field coils 30 and 32, and the minimum radius of field coils 30 and 32 is less than the minimum radius of each tooth 14). Although this configuration is preferred because it provides a compact device, the field coils 30 and 32 may be located anywhere within the shell 18 as is convenient for the required design (all that is required is the proper number of amp-turns necessary to induce the required flux in the rotor for a given output power).

Flywheel device 10 may also include upper and lower bearing coils 36 and 38, respectively, in which case bearing coils 36 and 38 are mounted to field coils 30 and 32 such that bearing coils 36 and 38 are physically between field coils 30 and 32 and rotor 12. Bearing coils 36 and 38, if installed, may be controlled to function in the same manner as a conventional axial magnetic bearing or to relieve a set of mechanical bearings (not shown) of a majority of the weight of rotor 12. As with the field coils 30 and 32, the specific location of the bearing coils is not critical. For example, the field coils and the bearing coils could be swapped in the embodiment shown in FIG. 2 without resulting in any negative operational effects.

One or more strain gauges (not shown) may be attached to shell 18 to control bearing coils 36 and 38. The strain gauges would provide inputs to a closed-loop controller (not shown) that commands the coils 36 and 38 to increase the flux density in the upper air gap 26 by a given amount while lowering the flux density in the lower air gap 28 by the same amount. The net affect of this variation is to support a majority of the weight of the rotor while maintaining an optimum constant load on the mechanical bearing (not shown). The fact that the rotor is a solid magnetic component enables the bearing coils 36 and 38 to operate directly on the rotor (rather than on a separate steel rotor as in previously known composite flywheel systems).

Persons skilled in the art will appreciate that, although the inclusion of bearing coils 36 and 38 is one convenient way to control the axial forces applied to rotor 12 across gaps 26 and 28, it is also practical to omit bearing coils 36 and 38. In such circumstances, the axial forces across gaps 26 and 28 could be controlled by driving field coils 30 and 32 separately, in which case, the net force on rotor 12 is a function of the difference between the currents in the separately controlled field coils 30 and 32.

A pair of upper and lower smooth laminated rings 40 and 42, respectively, are also located within shell 18 (the rings are referred to as "smooth" because the surface facing the rotor is smooth when compared to prior art laminated rings in which slots or holes are cut for armature coil placement). Persons skilled in the art will appreciate that a single laminated ring may be used instead of the pair of rings when the single shell configuration is selected. If the single laminated ring is used and no separator ring 24 is installed, shell 18 is simply interrupted where the separator would have been. The result is that some of the flux driven by bearing coil 36 goes through gap 28 and slightly more power is required for the bearing function.

Laminated rings 40 and 42 may be made from laminated stacks of rings or arcs segments of high permeability material such as soft iron or steel (such that the material is only magnetized in the presence of an externally applied magnetic field). Alternatively, rings 40 and 42 may be formed from a solid high permeability material such as ferrite, or any other suitable material. Rings 40 and 42 are mounted within shell 18 such that they are located between the radially outermost edge of rotor 12 and shell 18. Depending on the desired operating parameters, rings 40 and 42 may be located directly adjacent shell 18 or, instead, may be located radially inward of shell 18 such that an additional air gap 54 is formed between shell 18 and rings 40 and 42. Additional air gap 54 improves the flux diffusion in the laminated ring, thus allowing it to be smaller (which provides the additional advantage of making it less expensive). The additional air gap 54 also further increases the reluctance of the field circuit, decreasing the inductances and time constant of both the field and armature coils.

Figure 4:
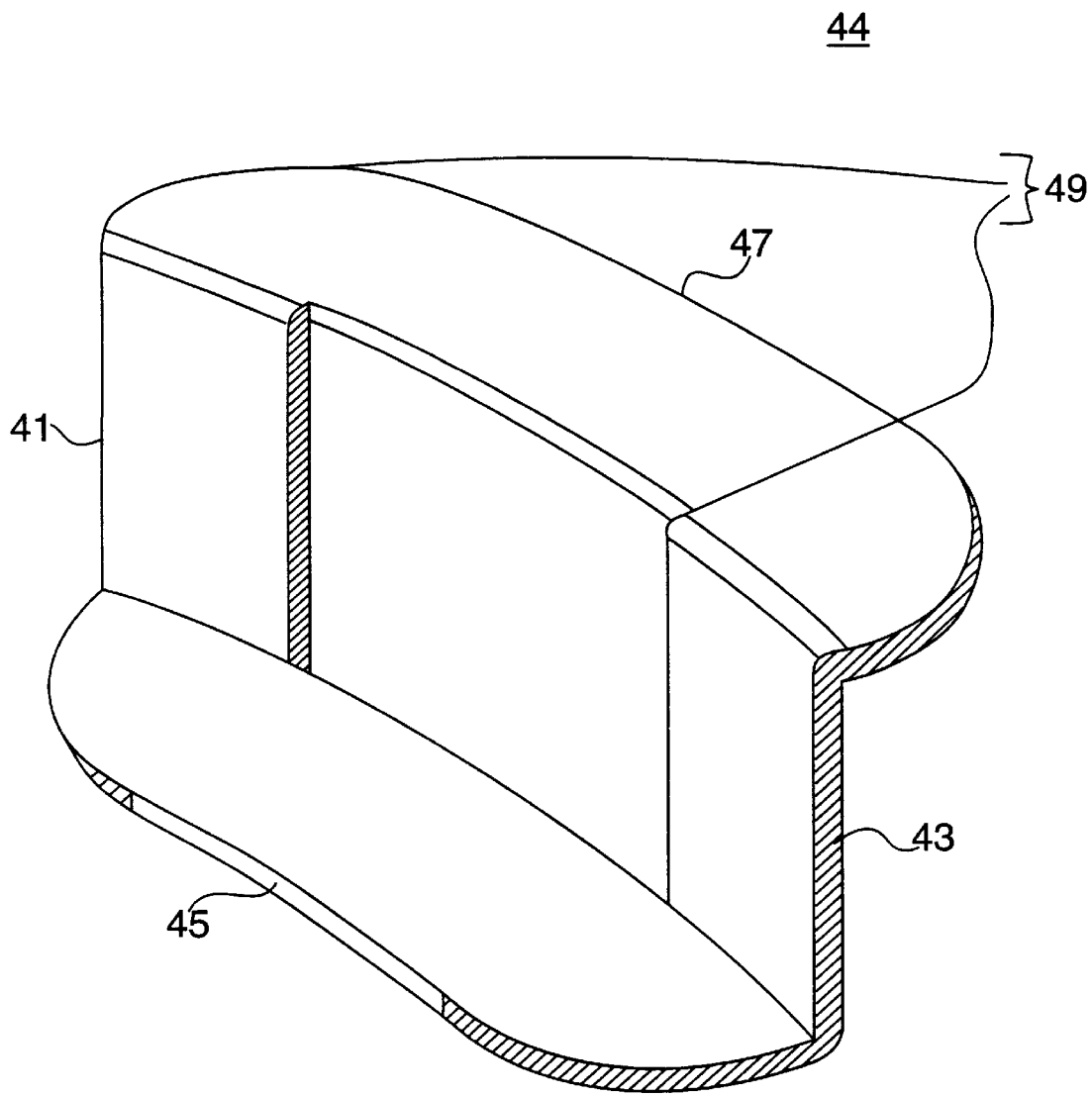
FIG. 4 is a three-dimensional perspective view of a preferred airgap armature coil constructed in accordance with the principles of the present invention.

Several airgap armature coils 44 are located within an armature air gap 46 that is formed between rotor 12 and laminated rings 40 and 42. In preferred embodiments of the present invention, airgap armature coils 44 are Z-shaped coils that take up very little axial space (in the radial embodiments), as shown in greater detail in FIG. 4. As shown in FIG. 4, each armature coil 44 includes a pair of vertical legs 41 and 43 that are exposed to flux passing through rotor protrusions 14. Airgap coils 44 are preferably formed into Z-shapes such that vertical legs 41 and 43 are integral with cross members 45 and 47 to form complete coil loops. Leads 49 are formed from armature coil 44 so that the armature coils may be connected to additional circuitry (e.g., electronics that apply motoring currents or draw energy from the flywheel device).

Figure 5:
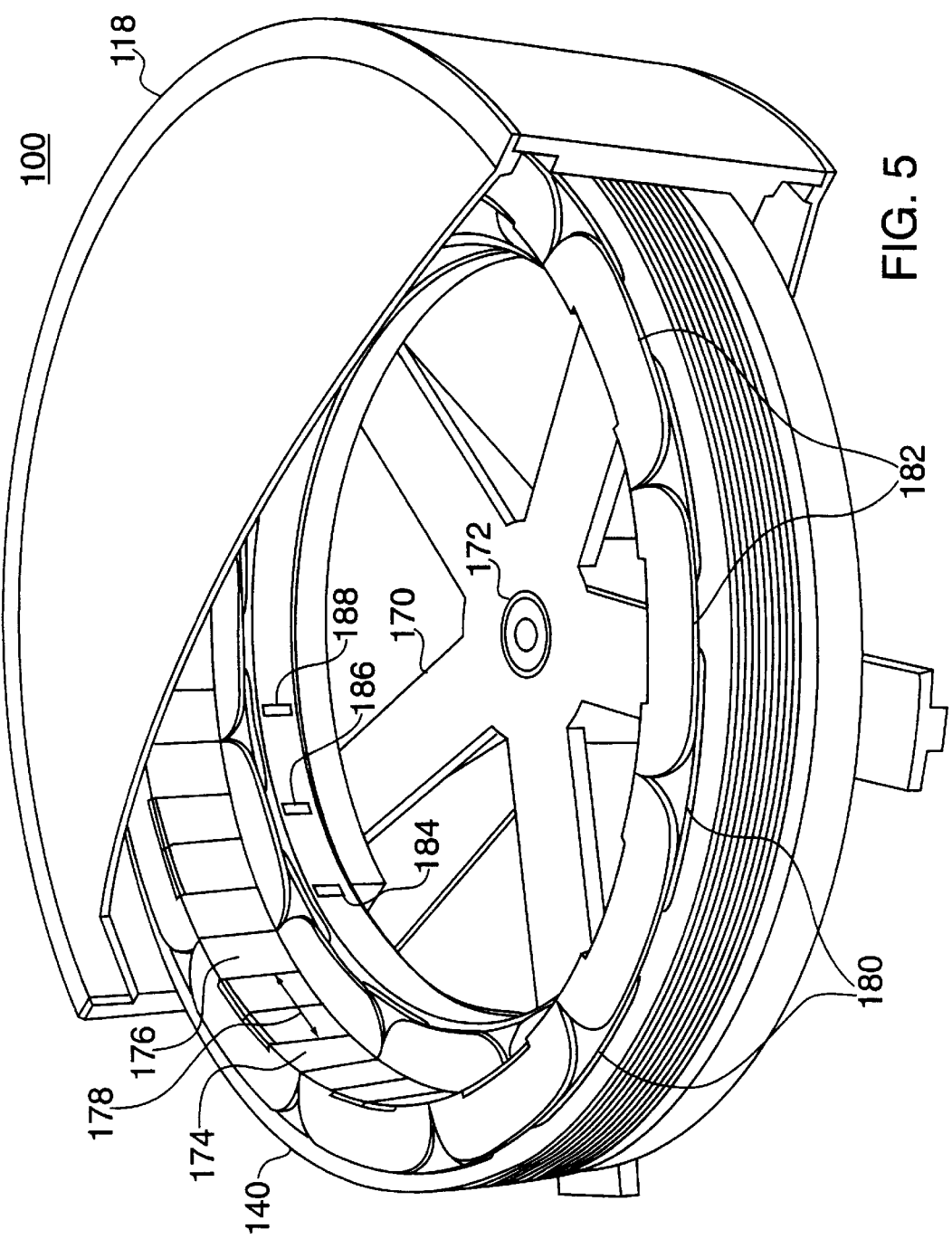
FIG. 5 is three-dimensional cutaway view of the shell of an alternate embodiment of a flywheel device in accordance with the principles of the present invention that shows one preferred configuration of the airgap armature coils.

The preferred physical layout of Z-shaped armature coils 44 is shown in FIG. 5 and described in more detail below. Airgap armature coils 44 may be formed from a unitary piece of solid electrically conductive, low permeability material (e.g., copper), but are preferably made up of turns of wire, each of which may consist of a plurality of electrical conductors that are electrically insulated from each other and are electrically connected together in parallel. One such wire, known as litz wire, is constructed of individual film-insulated wires which are bunched or braided together in a uniform pattern of twists and length of lay (thus, a coil formed of litz wire has at least one set of conductors that are parallel to each other coupled together in series with at least one other set of parallel conductors). This configuration reduces skin effect power losses of solid conductors, or the tendency of high frequency current to be concentrated at the conductor surface. Properly constructed litz wires have individual strands each positioned in a uniform pattern moving from the center to the outside and back within a given length of the wire. In addition to the reduction of skin effect losses, litz wire and other multi-strand bundles of small gauge wire produce dramatically lower eddy current losses than a single strand of larger gauge wire.

The effects from the operation of flywheel device 10 are illustrated in FIGS. 2 and 3 as follows. Flywheel device 10 is operated by applying a substantially DC current (or varying DC current) to field coils 30 and 32, which creates a magnetic circuit having a total reluctance that remains substantially constant while rotor 12 is rotating. The field coils 30 and 32 efficiently induce substantially constant homopolar flux in the spinning rotor 12 (this flux, which is constant because only DC current is applied to the field coils, does not cause substantial hysteresis and eddy current losses that might otherwise negatively effect the performance of the flywheel device). The flux density is proportional to the current in field coils 30 and 32. The induced flux, as indicated by reference numerals 48 and 50, travels radially outward through teeth 14 of rotor 12 (as shown by the arrows at reference numeral 52 of FIGS. 2 and 3).

The flux passes from rotor teeth 14 through armature gap 46 into laminated rings 40 and 42, as indicated by arrows 56 (only ring 40 is shown in FIG. 3). The laminated rings 40 and 42 act, in accordance with the principles of the present invention, to diffuse the flux before it enters shell 18. The flux traveling through flywheel device 10 normally travels along the path of least reluctance, i.e., along radials directly out of the teeth 14 and into the shell 18.

Without the flux diffusion that takes place in laminated rings 40 and 42, the flux tends to arrive at shell 18 as a high amplitude wave that follows the rotation of rotor teeth 14. Considering the total length of the magnetic circuit and the high reluctance of extra air gap 54 (if used), however, the reluctance is substantially the same in the somewhat non-radial paths shown by the curved arrows in FIG. 3 as in the purely radial paths. Therefore, the flux diffuses in the laminated rings until the flux density is substantially uniform and independent of tooth position by the time the flux passes into unlaminated shell 18. This greatly reduces hysteresis and eddy current losses.

A further improvement on the principles of flux diffusion of the present invention may be accomplished, when necessary, by providing additional air gap 54 between shell 18 and laminated rings 40 and 42. The inclusion of additional air gap 54 permits a radial reduction in the size of laminated rings 40 and 42, which reduces the core losses due to the rotating flux in the laminated rings and reduces manufacturing costs (less laminated material is necessary). The additional air gap 54 acts as a high reluctance barrier that forces flux diffusion to occur in the radially smaller laminated rings. In practice, additional air gap 54 may be filled with a low permeability material.

Once the flux enters shell 18, the flux changes direction so that it is traveling parallel to the axis of rotation, as shown by arrows 56. Upon reaching the axial limits of shell 18, the flux makes another perpendicular change in direction and begins traveling radially toward the axis of rotor 12 (as shown by arrows 58 and 60). The flux again turns axially (as shown by arrows 62) and crosses axial air gaps 26 and 28 (as shown by arrows 64) before reentering rotor 12. The total area of the air gaps (whether two air gaps or three are used) remains constant regardless of rotation of rotor 12, and therefore, the total flux in the circuit does not change with rotation.

In known generators having armature coils embedded in the laminated ring, the discontinuities produced by the slots (or holes) for the armature windings cause the total flux and reluctance to both vary somewhat with rotation of the rotor, thereby causing higher losses. By keeping the total flux and reluctance constant, losses in the solid steel parts of the circuit are kept small and the circuit remains efficient (i.e., the generation of heat is kept to a minimum). Additionally, the extra manufacturing required to cut slots in laminated rings for the armature windings further increases the overall costs of devices employing traditional armature windings.

Even though the total flux and reluctance in the circuit remain constant, the rotating teeth 14 produce a rotating peak flux density in armature air gap 46 and in the laminated rings 40 and 42. The rotating peak flux density in armature air gap 46 induces a current in stationary armature coils 44. The output voltage of armature coils 44 is directly proportional to the tip speed of rotating teeth 14 and to the flux density of armature air gap 46, while power is proportional to the square of voltage (given a constant circuit impedance). Because armature air gap flux density is directly proportional to the current applied to the field coils 30 and 32, the flywheel device of the present invention is able to easily maintain a constant output voltage by merely slowly increasing the current applied to field coils 30 and 32 as rotor 12 slows down. This eliminates the need for expensive power electronics often used in conjunction with known energy storage devices. Further, by simply coupling every third armature coil 44 together, flywheel device 10 is able to produce a three-phase alternating current output signal.

A further advantage of the present invention is the fact that flywheel device 10 may be used as a three-phase brushless motor with only minor changes from the previously described configuration. The modifications required for use as a motor are shown more clearly with respect to FIG. 5. FIG. 5 shows a preferred configuration of airgap armature coils 44 of FIGS. 2 and 4. Flywheel device 100 includes a shell 118 of substantially high permeability material, such as steel, and a single laminated ring 140 that is similar to laminated rings 40 and 42 described above. Also included within shell 118 is a support frame 170 that is formed from a non-magnetic material and a mechanical bearing 172 that holds the shaft of the rotor (not shown in FIG. 5). In the embodiment shown in FIG. 2, support frame 170 may be eliminated if the horizontal portion of shell 18 is extended to cover the center of rotation such that shaft 34 may be mounted therein.

Flywheel device 100 includes twenty-four instances of armature coil 44 (of FIGS. 2 and 4) mounted about the circumference of laminated ring 140 in two offset layers. The preferred armature coils 44 are designed such that each of the two vertical legs 174 and 176 are spaced apart to form a window 178 approximately equal to two legs. A lower layer of twelve armature coils 180 are placed adjacent to each other about the circumference of laminated ring 140. Then an upper layer of twelve armature coils 182 are placed on top of the lower layer of coils 180, offset from the lower layer such that the adjacent legs of each lower layer pair show through the window 178 of each upper layer armature. Thus, the armatures coils of the present invention are not separated by iron slots (as is traditionally done), and more wire can fit within a given air gap. The ability to provide an increased volume of wire in the air gap is an additional factor that makes the flywheel devices of the present invention more compact, resulting in a higher power density than previously known flywheels.

Although twenty-four armature coils 44 are shown in FIG. 5, persons skilled in the art will appreciate that various other configurations may be utilized without departing from the scope of the present invention. If the desired device is a three-phase device, however, the total number of armature coils should be divisible by three in order to maintain proper phase alignment.

Each of the armature coils 44 is also provided with a pair of leads 49 from which signals can be input or output. When flywheel device 100 is being utilized as an energy output device, the output voltage is simply taken from leads 49 and efficiently rectified and filtered, as necessary. In that instance, kinetic energy is efficiently converted into electrical energy and flywheel device 100 operates essentially as a battery, but without the use of potentially dangerous chemicals.

To add energy to flywheel device 100, it is driven as a three-phase motor. In the simplest motor implementation, three additional sensors are preferably added to the circuit. Hall effect sensors 184, 186 and 188 are located such that they monitor the flux density at the left-most leg of three consecutive armature coils 44. Commutation of each group of armature coils (as in the generator configuration, the armature coils are connected together in three groups) is controlled based on the input signals from sensors 184, 186 and 188.

All armatures of a group are driven whenever the sensors sense that an entire left leg is covered by one of teeth 14 (assuming that the teeth are rotating from left to right past sensors 184, 186 and 188 across the armature coils (as shown in FIG. 5)). In this manner, each phase is driven, in sequence, to continue to drive the rotor about its axis. One advantage to the flywheel device of the present invention is that, while many applications require a high power discharge to draw energy from the flywheel, energy may be replenished at a significantly slower rate. Driving power into the flywheel at a slower rate provides a dramatic cost reduction which, by only driving current one way through armature coils 44, may be further reduced due to fact that fewer power transistors are necessary. An improvement in reliability is also provided due to the simplification in required drive logic. The same sensing scheme may also be used with conventional three-phase controller circuitry to drive armature coils 44 with bi-directional current. It is also possible to use the back-EMF pulses from armature coils 44 to control motoring commutation without the need for Hall effect sensors. Further, those skilled in the art will appreciate that optical sensors may also be used to provide commutation information.

It should also be noted that the energy requirements from energy storage devices are such that full power is often required in an on-demand mode. To provide such a capability from the flywheel devices described above, the field circuit is preferably kept sufficiently energized at all times (at least in part, due to the delay caused by the inductance of the field circuit). This requirement, however, produces a small constant power drain due to field coil heating and core losses in the laminated ring and solid steel parts.

Various features of the present invention, particularly including the smooth laminated ring without armature coil slots or holes, greatly reduce these constant standby losses. Nevertheless, if a very large amount of energy is required, it may be preferable to provide a multi-flywheel system in which only one flywheel is maintained in a fully or nearly fully energized state. The energized flywheel must be able to produce enough power to account for the power requirements during the time the other flywheels are increased to their fully energized states (i.e., full operating flux is being produced). In this case, core losses and field coil heating may be minimized while still providing for the immediate output of the required power.

Figure 6:
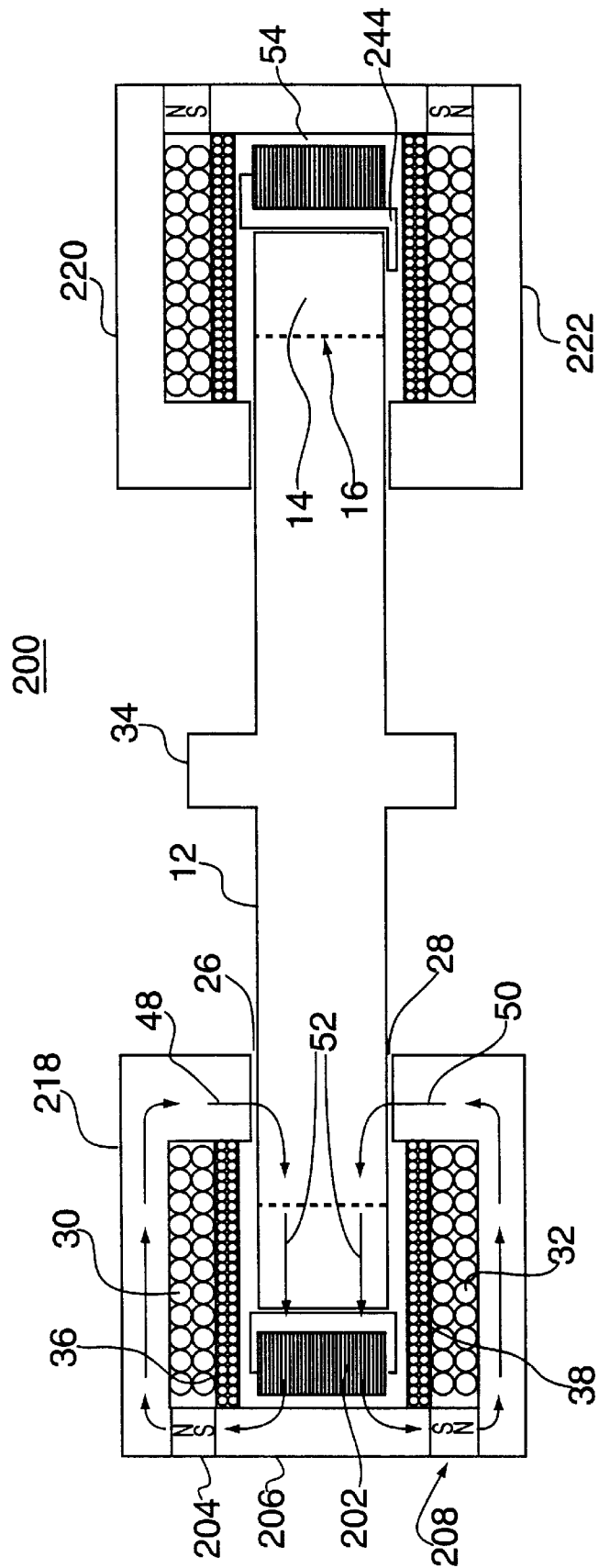
FIG. 6 is a longitudinal cross-sectional view of an alternate embodiment of a flywheel energy conversion device constructed in accordance with the principles of the present invention.

FIG. 6 shows an alternate embodiment of the present invention in flywheel device 200. Flywheel device 200 is substantially similar to the flywheel device 10 of FIG. 2. The differences between the two flywheel devices are the fact that flywheel device 200 has a single laminated ring 202 (versus the two ring configuration shown for device 10) and the construction of the shells. While flywheel device 200 is shown with a single laminated ring 202, persons skilled in the art will appreciate that the two ring configuration of FIG. 2 may be equally applied to flywheel device 200.

The primary difference between flywheel device 10 and flywheel device 200 is the addition of permanent magnets to flywheel 200. Shell 218 is formed from an upper shell 220 and a lower shell 222 that are both substantially similar to upper and lower shells 20 and 22 of FIG. 2. Attached to upper shell 220, however, is upper axially polarized annular permanent magnet 204, which may be a single magnet, or, due to manufacturing constraints, may be a set of arc segments fitted together to form a ring. An additional annular section 206 of high permeability material (preferably steel) is attached to upper permanent magnet 204, while lower axially polarized annular permanent magnet 208 is attached to section 206. Lower shell 222 connects to lower permanent magnet 208 to complete shell 218.

Flywheel device 200 operates in a similar manner to flywheel device 10, however, the inclusion of permanent magnets 204 and 208 eliminates the need for field current when the flywheel is idling at its top speed in the standby state. During that time, the permanent magnets 204 and 208 act to drive the flux through the magnetic circuit without any additional drive current. This feature of the present invention eliminates the field coil's $I^2R$ power losses during standby operation and further increases the reluctance of the field circuit, which decreases the inductance of the armatures even further. Even though these improvements are advantageous, the use of permanent magnets may significantly impact the overall cost of the device. Thus, under practical conditions, this permanent magnet embodiment may only be applicable where the reduction of standby losses and the achievement of ultimate power density is critical. Additionally, while flywheel 200 is shown having additional air gap 54, persons skilled in the art will understand that this is merely an option and that the additional gap 54 may be eliminated without departing from the spirit of the invention.

Figure 7:
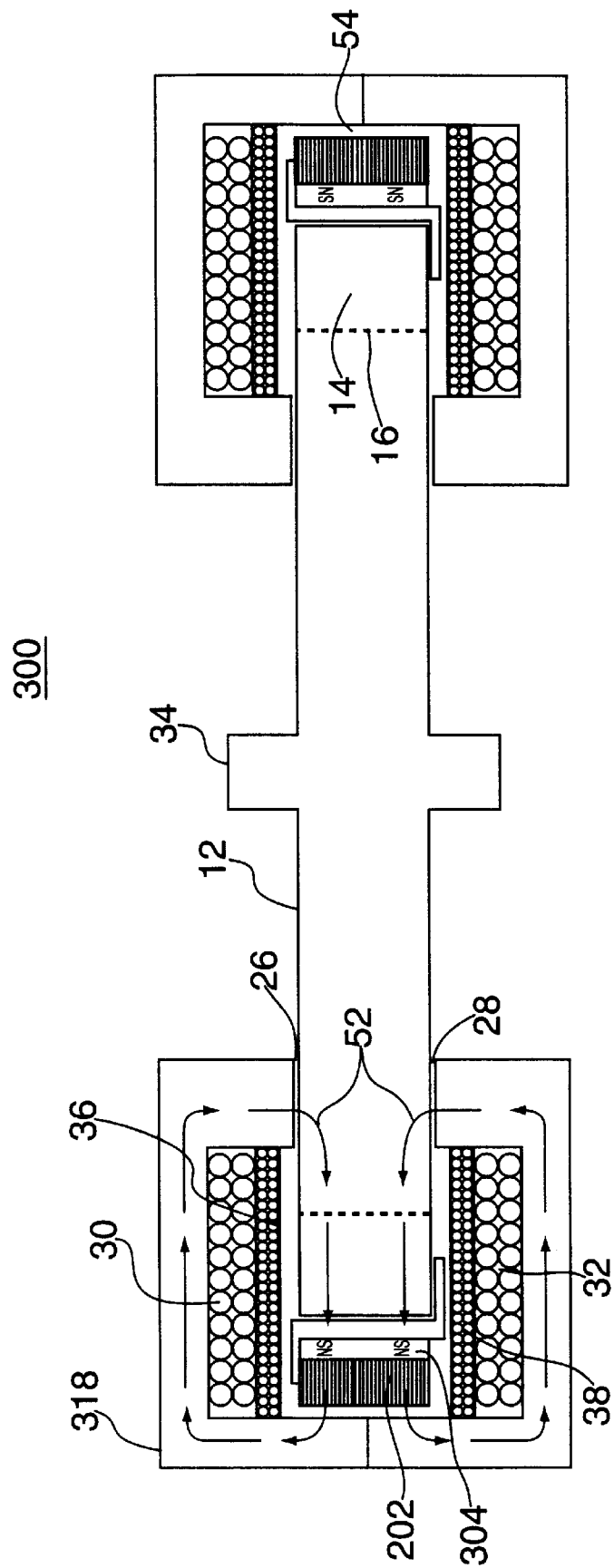
FIG. 7 is a longitudinal cross-sectional view of another alternate embodiment of a flywheel energy conversion device constructed in accordance with the principles of the present invention.

A second permanent magnet alternate embodiment is presented in FIG. 7 which shows flywheel device 300. Similarly to flywheel device 200, flywheel device 300 is shown having a single laminated ring 202, but, as described above, a dual laminated ring configuration may also be utilized. Flywheel device 300 varies from the flywheels previously described in that a ring of substantially radially polarized permanent magnet segments 304 (a single annular permanent magnet ring may also be used) are attached to the inner surface of the laminated ring 202. The use of permanent magnet segments 304 provides the same benefits as described above with respect to permanent magnets 204 and 208, however, the magnet 304 may need to occupy a larger volume due to the axial extent of the rotating teeth 14. The larger volume provides an additional advantage in that a lower energy-product magnet material may be used (i.e., lower costs). An additional advantage of the radially polarized magnets is that they enable additional flux diffusion to occur (assuming the magnets are made of a low permeability, low conductivity material), while also further reducing the inductance of the armature coils to allow still higher power density. Further, as described above, the inclusion of additional air gap 54 is optional.

Figure 8:
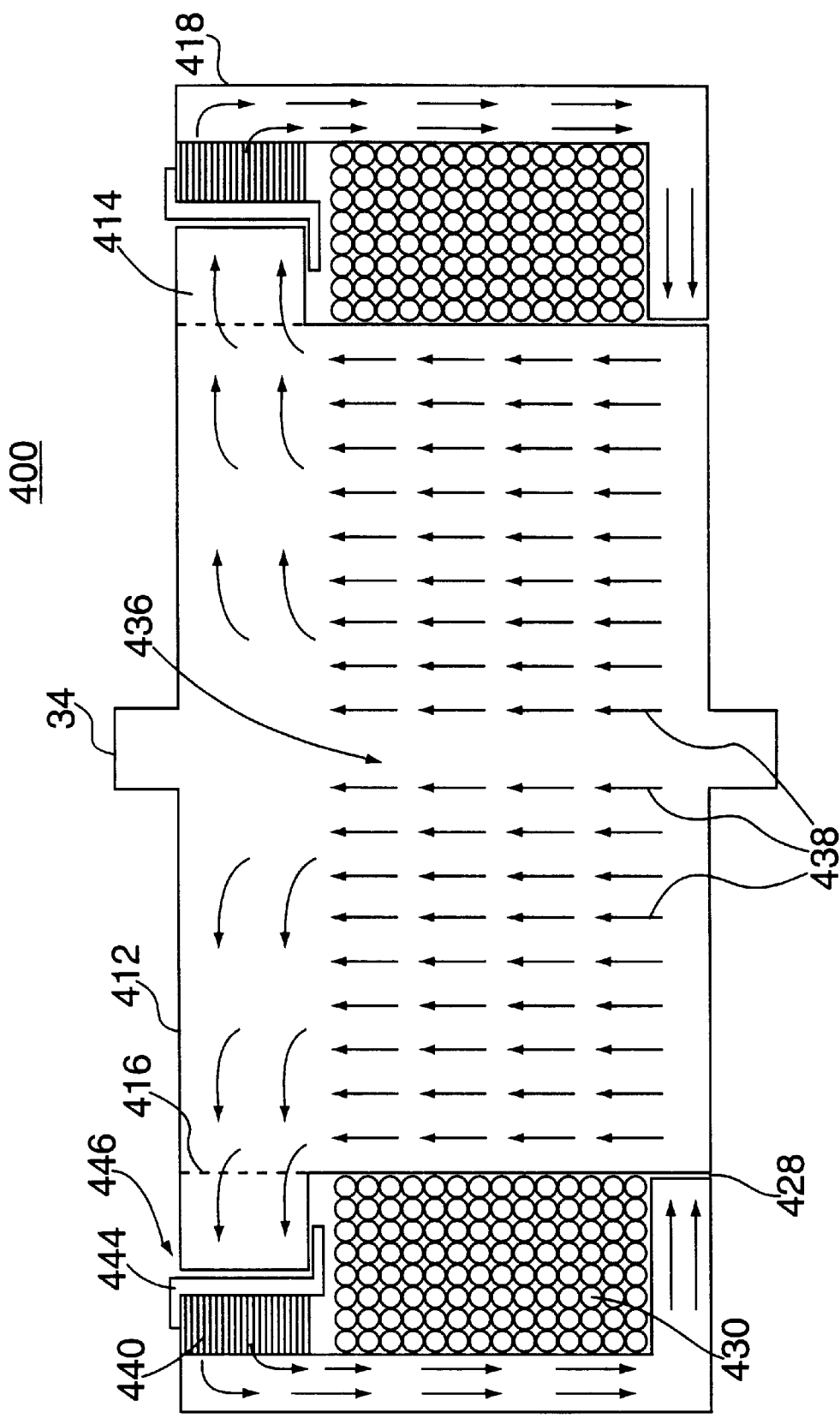
FIG. 8 is a longitudinal cross-sectional view of a single field coil alternate embodiment of a flywheel energy conversion device constructed in accordance with the principles of the present invention.

In addition to the dual field coil configurations described above, the principles of the present invention may be practiced through the use of several single field coil configurations as shown in FIGS. 8–11. FIG. 8 shows flywheel device 400 that includes a rotor 412 having teeth 414 as defined by dashed line 416 and described above, as well as a lower portion 436. Rotor 412 rotates within a stationary shell 418 (formed from a single piece of high permeability material such as steel). A single field coil 430 induces unidirectional axial homopolar flux in lower portion 436 upon the application a substantially DC current. The flux travels from lower portion 436 to the teeth 414 of rotor 412 as shown by arrows 438.

The flux travels in an outward radial direction upon reaching the approximate top of rotor 412 and exits rotor 412 through teeth 414 as previously described for flywheel 10 (with respect to rotor 12 and teeth 14). Upon exiting teeth 414, the flux crosses armature gap 446 and passes through armature coils 444 into single laminated ring 440. Laminated ring 440 acts to diffuse the flux before the flux enters shell 418 in the same manner as previously described. The flux then travels axially through shell 418 before turning perpendicularly toward the axis of rotor 412. Finally, the flux traverses a small air gap 428 before reentering rotor 412.

As previously described, the total flux and reluctance in the circuit do not change with the rotation of rotor 412, however, the rotating teeth 414 do produce a local changing flux density in the armature air gap 446 and in the laminated ring 440 as it passes through. As previously described with respect to FIG. 4, the leads of airgap coils 444 may be connected to external circuitry that causes the armature to interact with this changing flux density to convert the flywheel's kinetic energy to electrical energy or to convert externally supplied electrical energy into kinetic energy. The components of flywheel 400 have essentially the same properties as those previously described for flywheels 10, 100, 200 and 300 with respect to proportions between induced voltage, changing flux, flux density and current in the field coil.

Figure 9:
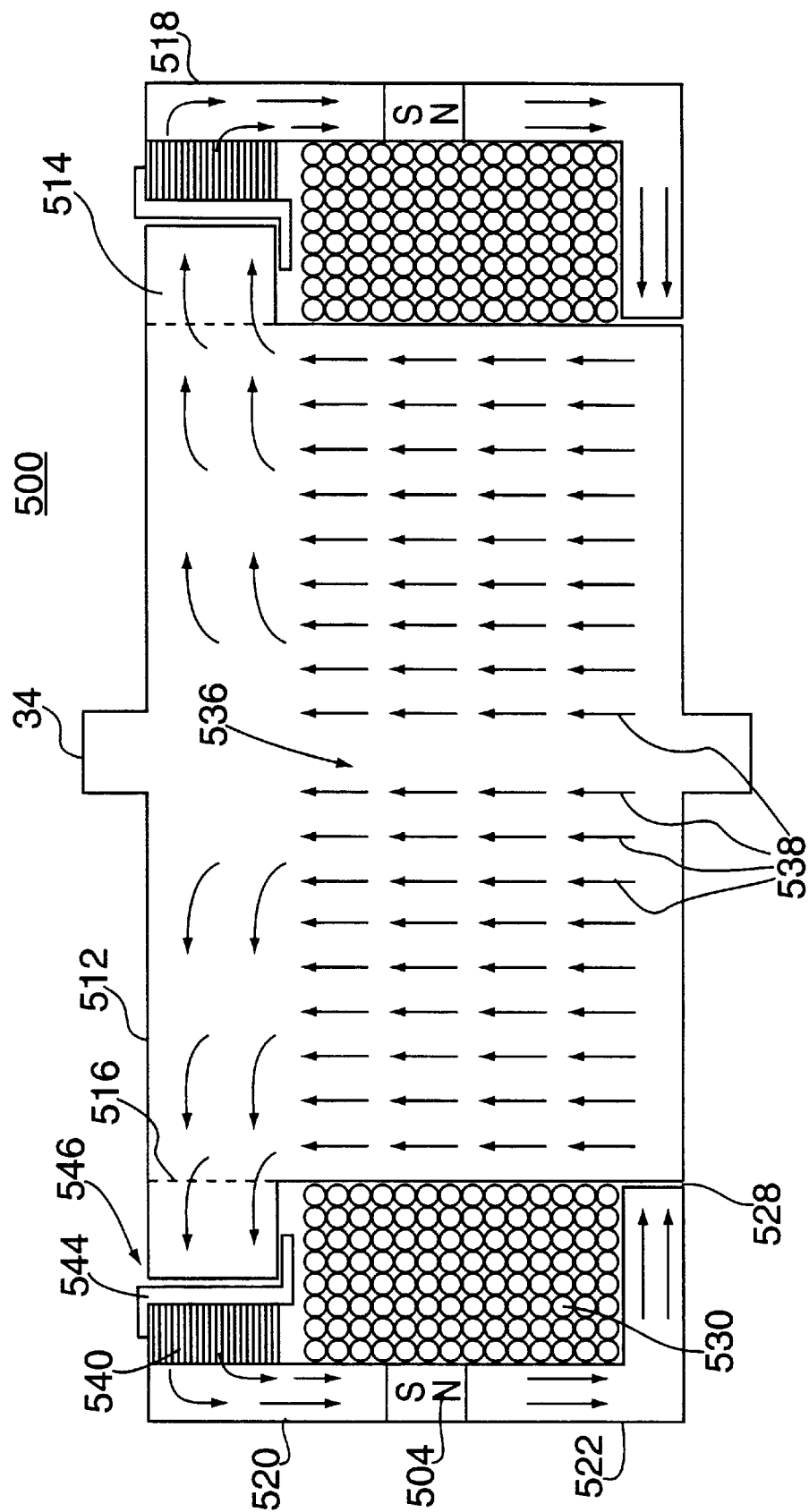
FIG. 9 is a longitudinal cross-sectional view of an alternate embodiment of a single field coil flywheel energy conversion device constructed in accordance with the principles of the present invention.

FIG. 9 shows an alternate embodiment of a single field coil flywheel device 500 that includes substantially all of the components of flywheel device 400. For simplicity, each of the components that is essentially identical between flywheel devices 400 and 500 has the same last two digits of the reference numeral and therefore, the discussion above applies equally to them (and they are not discussed further). The principal difference between flywheels 400 and 500 is the inclusion of a permanent magnet 504, in a manner similar to that previously described with respect to FIG. 6. Shell 518 is formed of an upper shell 520 that is attached to magnet 504, and magnet 504 is attached to lower portion 522. Even though flywheels 400 and 500 are shown without an additional air gap between the laminated stack and the shell, persons skilled in the art will appreciate that the additional air gap may also be used here.

Figure 10:
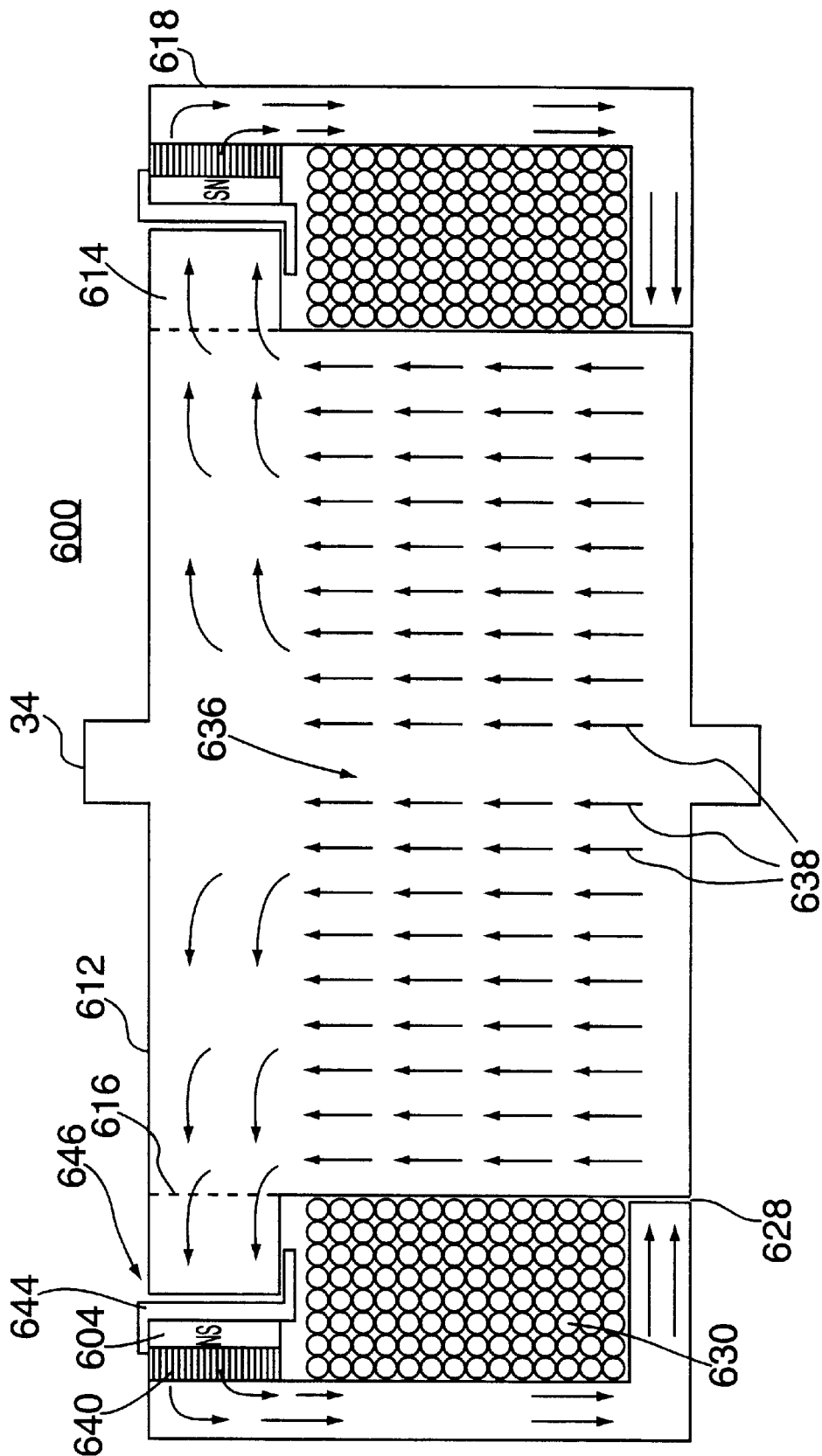
FIG. 10 is a longitudinal cross-sectional view of another alternate embodiment of a single field coil flywheel energy conversion device constructed in accordance with the principles of the present invention.

FIG. 10 shows another alternate embodiment of a single field coil flywheel device 600 that includes substantially all of the components of flywheel devices 400 and 500. For simplicity, each of the components that is essentially identical between flywheel devices 400, 500 and 600 has the same last two digits of the reference numeral and therefore, the discussion above applies equally to them (and they are not discussed further). The principal difference between flywheels 500 and 600 is the location of the permanent magnet 604. Flywheel device 600 employs the permanent magnet 604 in a manner similar to that previously described with respect to FIG. 7. Shell 618 is formed of a single piece of high permeability material and the permanent magnet 604 is attached to laminated ring 640. Further, flywheel 600 may also have an additional air gap between the laminated stack and the shell even though none is shown.

Figure 11:
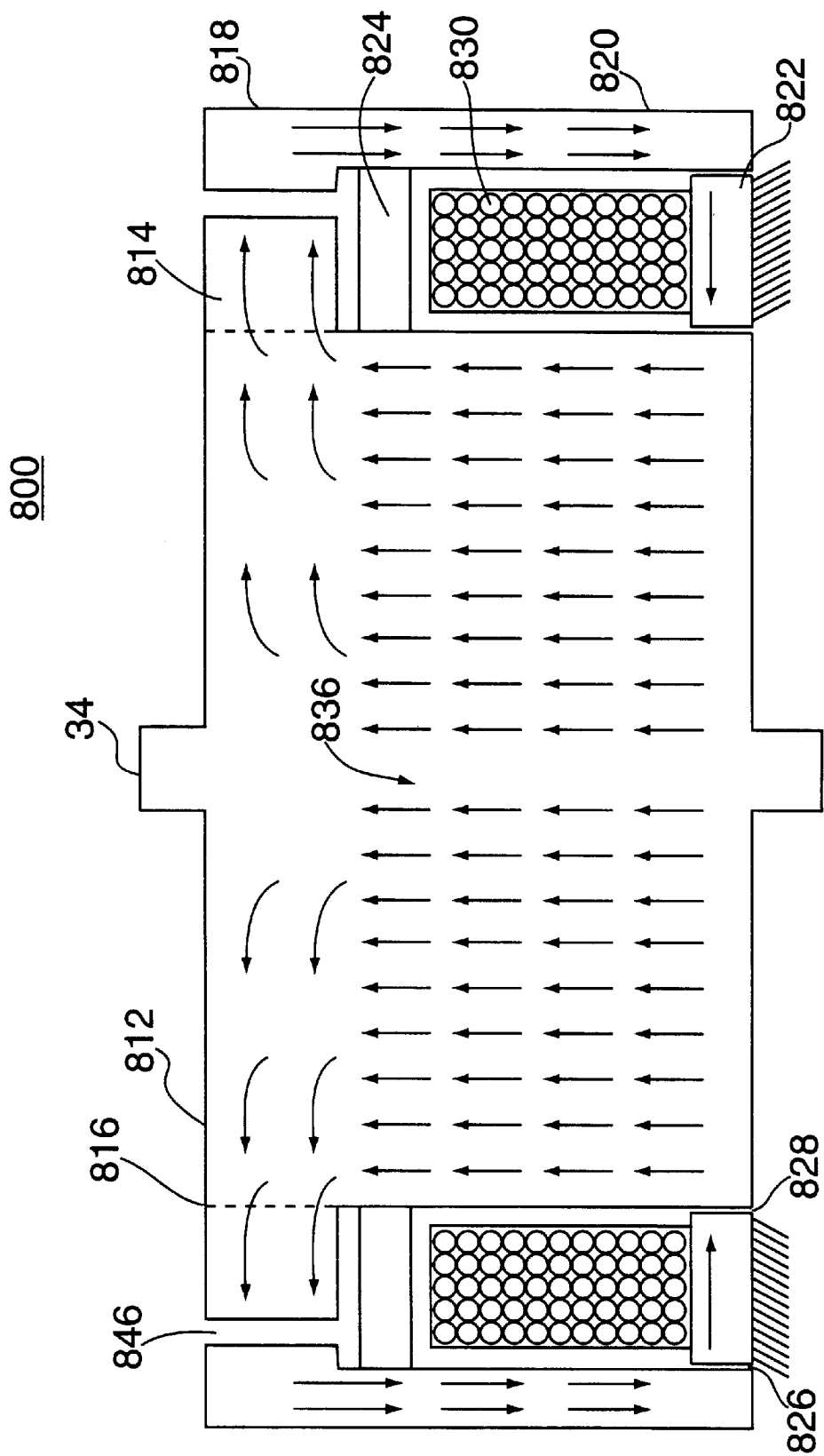
FIG. 11 is a longitudinal cross-sectional view of another alternate embodiment of a flywheel energy conversion device constructed in accordance with the principles of the present invention.

FIG. 11 shows another alternate embodiment of the present invention in flywheel device 800. Flywheel device 800 provides a reduction in average stand-by losses. This advantage comes in exchange for an increase in mechanical complexity, a decrease in stored energy or a reduction in safety factor. As such, flywheel 800 may have to operate at lower rotational speeds than flywheels 10, 100, 200, 300, 400, 500 and 600 to achieve the same level of safety. Therefore, flywheel 800 may require a heavier flywheel to store the same energy as the other flywheels.

Flywheel 800 includes a rotor 812 having teeth 814 as defined at dashed line 816. Rotor 812 also includes a lower portion 836 that extends radially to the beginning of teeth 814. The lower portion 836 of rotor 812 is connected to a low-permeability disk 824 so that it rotates as rotor 812 rotates. The outer portion 820 of shell 818 is physically connected to non-ferrous disk 824 so that it also rotates in synchronization with rotor 812. An additional lower portion 822 of shell 818 is stationary and is fixed to annular field coil 830. Thus, in FIG. 11, only lower portion 822 and field coil 830 are stationary during normal operations. Lower portion 822 is positioned such that there are two gaps 826 and 828 on either side of portion 822. Outer portion 820 is positioned such that an armature gap 846 is formed between outer portion 820 and rotor 812. Armature coils 815 located in air gap 846 are preferably used to connect flywheel device 800 to other electrical equipment.

One of the advantages of flywheel 800 is the elimination of the laminated ring as a diffusion element. Instead, outer portion 820 is available for flux diffusion because the entire height of portion 820 tends to substantially homogenize the flux so that it is essentially equal at all circumferential positions by the time it enters lower portion 822.

Figure 12:
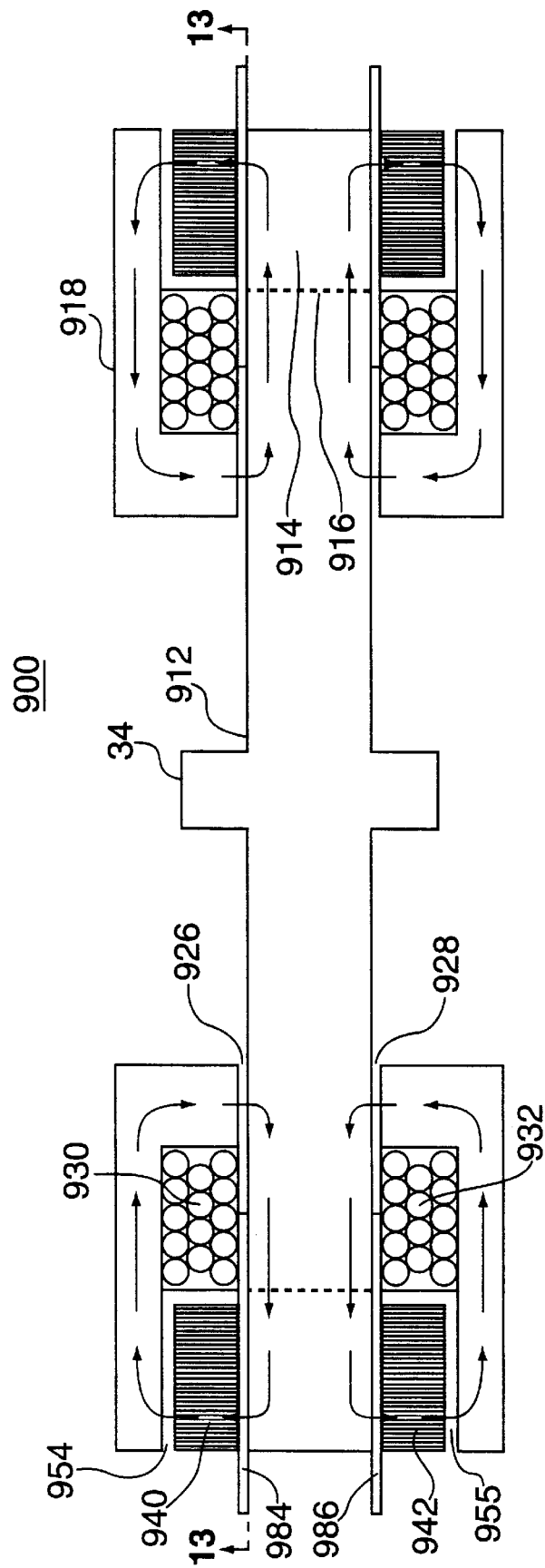
FIG. 12 is a longitudinal cross-sectional view of an alternate embodiment of a flywheel energy conversion device constructed in accordance with the principles of the present invention in which flux passes axially through the airgap armature coils.
Figure 13:
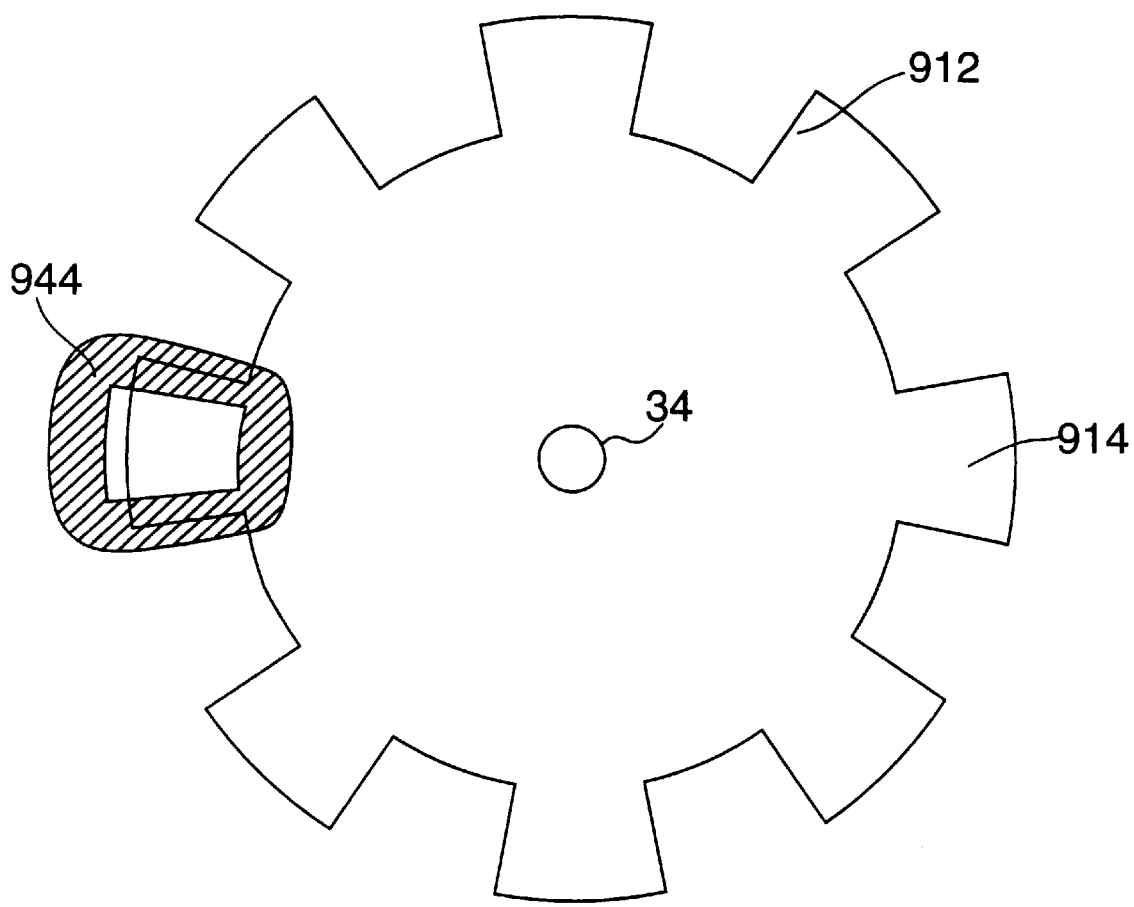
FIG. 13 is a partial cross-sectional top view of the flywheel energy conversion device of FIG. 12, taken from line 13—13 of FIG. 12.

While each of the above-described embodiments are illustrative of flux that passes radially through the armature coils, persons skilled in the art will appreciate that the principles of the present invention apply equally to embodiments in which the flux passes axially through the armature. One example of an axial flux embodiment is shown in FIGS. 12 and 13 by dual field coil flywheel device 900. Additionally, although flywheel device 900 is shown as a dual field coil device, persons skilled in the art will also appreciate that flywheel device 900 may be implemented with a single field coil (and associated armature coil) located either above or below rotor 912 without departing from the spirit of the present invention.

Flywheel device 900 operates on essentially the same principles as the previously described flywheel devices, except that the relative geometry is configured such that flux passes axially through the armature coils rather than radially. As such, and for simplicity, each of the components that is essentially identical between the previously described flywheel devices and flywheel device 900 has the same last two digits of the reference numeral and therefore, the discussion above applies equally to them (and they are not discussed further). While flywheel device 900 is preferably equipped with Z-shaped nested three-phase armature coils, similar to the previously discussed armature coils, armature coils 984 and 986 are shown as flat coils suitable for single phase output (compare the coils shown in FIGS. 4 and 5 with the coil shown in FIGS. 12 and 13).

Persons skilled in the art will appreciate that the single phase flat coils shown in FIGS. 12 and 13 may be used with any of the previously described embodiments of the invention without departing from the scope of the invention. Flat coils, which are simpler and less expensive to produce than Z-shaped coils, tend to reduce the power density of the generator, which may not always be a significant design consideration. Additionally, because the flux is axially traveling through laminated rings 940 and 942, rings 940 and 942 may also be produced at reduced costs (e.g., rings 940 and 942 may be produced by simply winding a coil of flat steel sheet onto a mandrel, which eliminates that part of the steel that is wasted from being cut out of previously described laminated rings, whether they be made from uninterrupted rings or arc segments).

Flywheel device 900 operates similarly to the previously described flywheel devices in that field coils 930 and 932 are driven by a substantially DC current. In the configuration of FIG. 12, however, the induced flux exits the teeth 914 axially, rather than radially from the tip of the teeth 914. The flux then travels through the airgap armature coils 984 and 986, and through the laminated rings 940 and 942, before entering the split shell 918. Although FIG. 12 shows a pair of additional air gaps 954 and 955, persons skilled in the art will appreciate that the gaps may be omitted, or they may be filled with a low permeability material, as previously described, without departing from the spirit of the present invention. Additionally, the principles of the present invention may be practiced by combining the embodiment shown in FIG. 12 with permanent magnets in any of the manners described above to change operational parameters of the flywheel device.

The configuration of flywheel device 900 provides the designer with additional factors to consider in making design selections. For example, flywheel device 900 has a smaller overall diameter than the previously described flywheel devices at the cost of slower average tip speed in air gaps 954 and 955 (for a given diameter). The smaller diameter also results in the non-rotating components of the magnetic circuits being lighter and being produced at lower costs.

Figure 14:
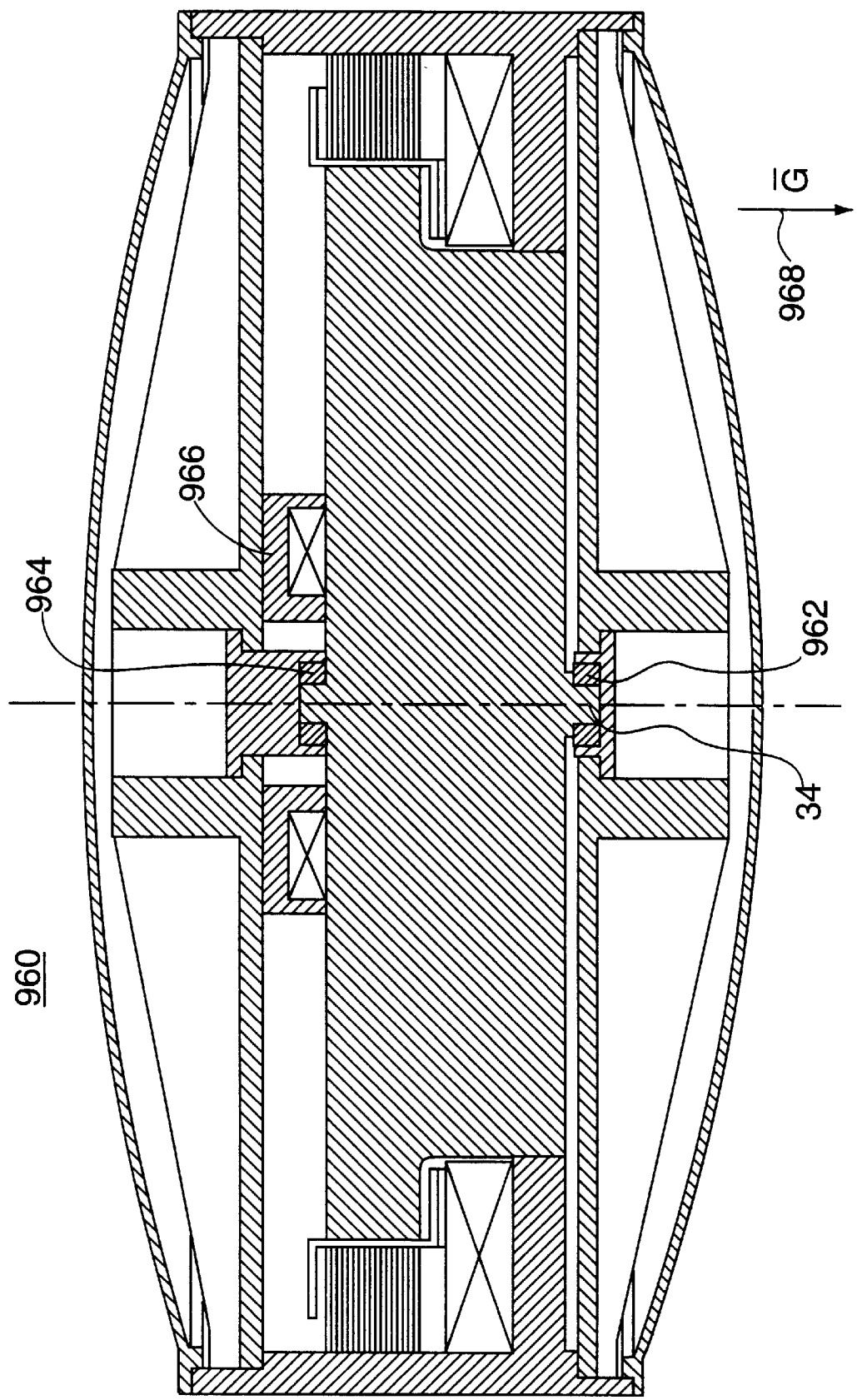
FIG. 14 is a longitudinal cross-sectional view of a representative installation of any of the flywheel energy conversion devices of FIGS. 8–11 constructed in accordance with the principles of the present invention.

FIG. 14 shows a representative installation of flywheel device 960 that may correspond to any of the flywheel devices described above (i.e., rotor including a single set of teeth and a laminated ring). As shown, however, FIG. 14 particularly applies to embodiments of the present invention that include a lower portion X36 as part of the rotor. Persons skilled in the art will appreciate that the principles of the invention shown and described with respect to FIG. 14 are equally applicable to those embodiments in which the rotor is simply a flat disk (with minor modifications to the installation shown in FIG. 14). As such, only the installation components are discussed with respect to FIG. 14. The shaft 34 of the rotor rests in two mechanical bearings 962 and 964. Mechanical bearings 962 and 964 are preferably simple ball bearings or roller bearings because they are cheap, simple and reliable.

In accordance with the principles of the present invention, the characteristics of the mechanical bearings 962 and 964 are greatly improved by reducing the loading on the bearings. Reduced load enables the bearings 962 and 964 to perform with minimum levels of drag and have extended service lives. Longest life, however, may be obtained from the mechanical bearings by insuring that some small load is maintained on the bearings, rather than substantially removing the entire load.

The load on mechanical bearings 962 and 964 is reduced through the use of a magnetic bearing in the form of annular electromagnet 966. One or more strain gauges 965 that provide inputs to a closed-loop controller (not shown) may be located on a support structure within the shell. The controller commands the electromagnet 966 to support a majority of the weight of the rotor while maintaining an optimum constant load on mechanical bearings 962 and 964. If the bearing and electromagnet supports are of adequate stiffness, the magnetic bearing may be controlled by a simple constant current, and no strain gauges are required. The fact that the rotor is a solid magnetic component enables the electromagnet 966 to operate directly on the rotor (rather than on a separate steel rotor as in previously known composite flywheel systems). Persons skilled in the art will appreciate that electromagnet 966 is most effective when flywheel device 960 is installed such that shaft 34 is substantially parallel to earth's gravity vector 968.

Figure 15:
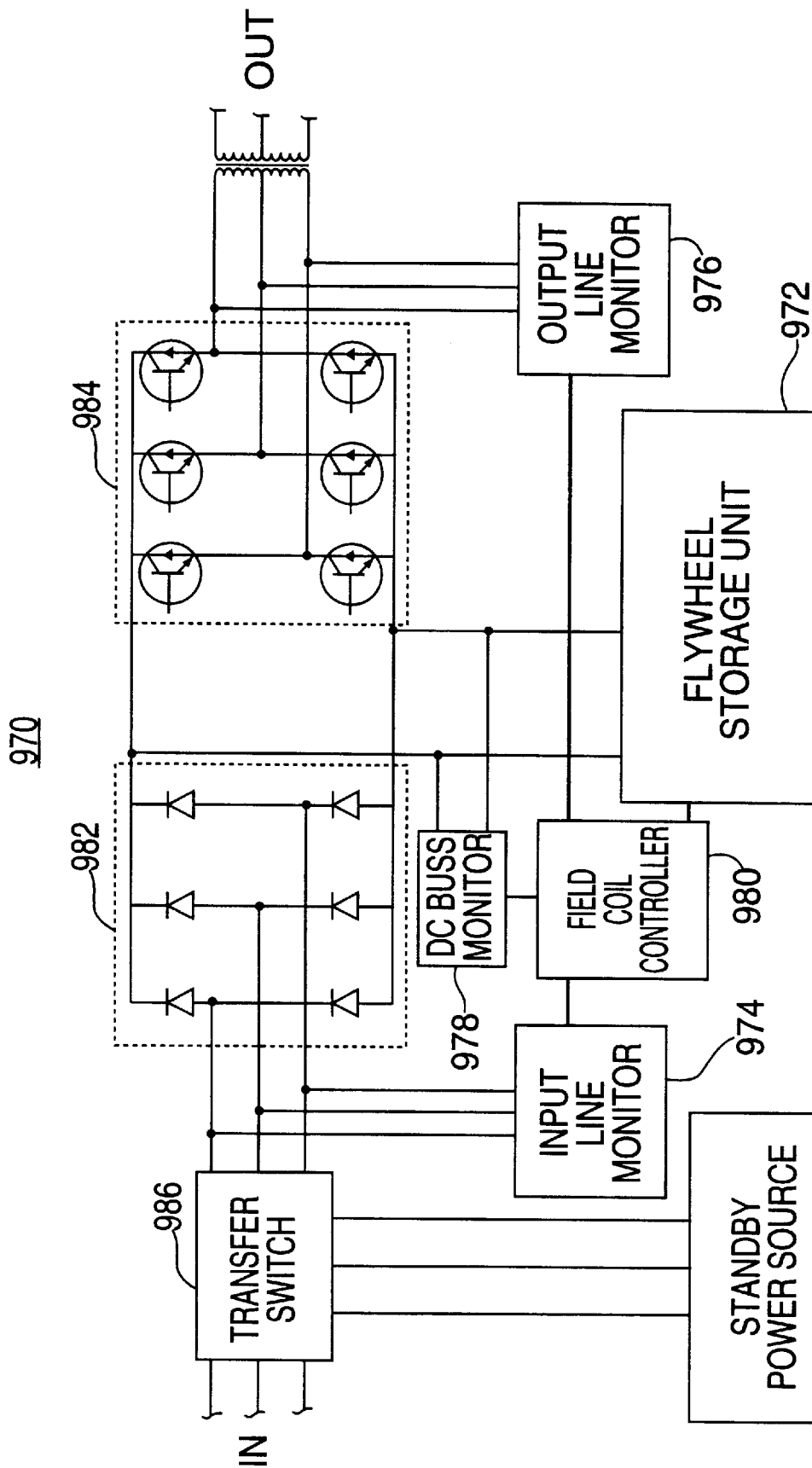
FIG. 15 is a schematic block diagram of an uninterrputable power supply system in accordance with the principles of the present invention.

FIG. 15 shows a representative example of how the principles of the present invention may be applied to provide an uninterruptable power supply system 970. System 970, which receives primary power at IN (typically from a power company), and provides supply power at OUT includes a flywheel storage unit 972 that may be any flywheel energy conversion device that includes a field controllable generator to provide short-term back-up power. System 970 includes at least one of the following: input line monitor 974, output line monitor 976 and DC buss monitor 978—any or all of which may serve to directly or indirectly monitor disruptions of the primary power, field coil controller 980, rectifiers 982 and inverter 984 (inverter 984 includes transistor timing and driving circuitry (not shown)). If longer term emergency power is required—i.e., longer than can be supplied by the kinetic energy stored in flywheel storage unit 972—transfer switch 986 may be included to transfer the supply lines to standby power source 988, such as a standby diesel generator.

Under normal operating conditions AC power is input from IN to rectifiers 982 which convert the power to DC. A small portion of the DC power is converted back into AC power by a small inverter (not shown) and provided to flywheel storage unit 972 to accelerate the flywheel to its nominal standby rpm, and to keep the flywheel spinning at its nominal standby rpm (i.e., to overcome the electrical and mechanical standby losses described above). To minimize losses, the field coil in flywheel storage unit 972 is preferably kept at a reduced value until a primary power failure is detected. The majority of DC power is fed to inverter 984 which converts the power back to AC and provides it to external circuity (not shown) through OUT.

Once a primary power disruption is detected by any of monitors 974, 976 or 978, field coil controller 980 sends a drive signal to the field coil in flywheel storage unit 972 that causes the field coil current to rapidly ramp up such that power required at OUT is provided by flywheel storage unit 972 (the present invention rapidly ramps up the field coil current such that field coil responds to the increased drive signal within substantially less than one second of the disruption in primary power). If necessary, a capacitor or other secondary storage device (not shown) may be used to provide power to maintain the buss voltage and to power the field coil during ramp up time, which should only take several milliseconds.

An additional feature of the present invention is that monitoring continues as power is supplied by flywheel storage unit 972 so that the output voltage is maintained at a relatively constant level until about ninety percent of the kinetic energy has been depleted from the flywheel. This may be accomplished by monitoring any of: the output voltage of flywheel storage unit 972, the output voltage at OUT, or the rotational speed of the flywheel. As kinetic energy is removed from the flywheel (i.e., it begins to slow down) and the output voltage of flywheel storage unit 972 begins to drop, field controller 980 slowly ramps up the field current being provided to the field coil which reestablishes and maintains the output voltage of storage unit 972 at a constant level. This technique becomes less effective as the amount of stored energy is reduced until, when approximately ten percent of the stored energy is remaining, the output voltage begins to drop because the field coil current has reached its maximum value and can no longer compensate for the rotor's decreasing rpm.

It will be understood that, in circumstances where the advantage of maintaining constant output voltage as rpm decreases is not required, the other advantages of the present invention may be achieved by using permanent magnets to drive the magnetic circuit instead of field coils (at a significantly increased cost, however, due to the use of expensive permanent magnet material). In such circumstances, the field coils would be entirely omitted, thus saving space and achieving a slight reduction in the amount of increased costs that will be incurred due to the permanent magnet material.

It will be understood that the foregoing is only illustrative of the principles of the invention, and that various modifications can be made by those skilled in the art without departing from the scope and spirit of the invention. For example, the advantages of a rotating steel shell portion may be applied to the non-extended rotor (i.e., rotor without the lower portion as shown in FIGS. 2–7) by utilizing the principles disclosed with respect to FIG. 11 even though that individual combination of components was not specifically described.

We claim:

1. An apparatus for converting between electrical and kinetic energy, said apparatus comprising:

a solid rotor having a plurality of integral protrusions extending therefrom and forming and axial air gap, said rotor being constructed of substantially magnetic material and having an axial thickness that remains substantially constant or decreases when measured at increasing radial positions;

a member that generates homopolar flux, said rotor and said flux generating member forming a magnetic circuit having a total reluctance that remains substantially constant while said rotor is rotated about an axis; and at least one stationary airgap armature coil mounted within said axial air gap with the active portion of said armature coil extends to substantially the entire axial length of said protrusions such that said flux induces an AC voltage in said at least one airgap armature coil when said rotor is rotated about said axis.

2. The apparatus of claim 1, wherein said rotor further includes an integral shaft.

3. The apparatus of claim 2, wherein said rotor is formed of a single piece of substantially high permeability material having first and second portions, said first portion being a substantially planar disk and said second portion being a shaft about which said disk portion rotates, said shaft having a radius less than the radially outermost edge of said protrusions.

4. The apparatus of claim 1 further comprising at least one ring having a substantially smooth surface, said ring being mounted concentric with respect to said rotor such that an armature air gap is formed between said protrusions and said smooth surface, said ring being constructed of substantially high permeability material.

5. The apparatus of claim 4, wherein said at least one ring comprises a pair of first and second rings mounted to a ring of non-magnetic material, said first ring being fixedly mounted to one side of said non-magnetic ring and said second ring being fixedly mounted to the other side of said non-magnetic ring.

6. The apparatus of claim 1, wherein substantially all of the axial length of said rotor forms said armature air gap and said armature coil is mounted within said air gap such that the active portion of said armature coil extends to substantially the entire axial length of said rotor.

7. The apparatus of claim 1, wherein said rotor further includes an integral lower portion that is substantially uniform about its circumference.

8. The apparatus of claim 1, wherein said rotor is a steel rotor that includes an integral shaft that said rotor is rotated about, said apparatus further comprising:

a pair of upper and lower mechanical bearings that said shaft is rotatably mounted within; and an electromagnet mounted with respect to said rotor such that said electromagnet, when energized, removes a majority of the weight of said rotor from said mechanical bearings.

9. The apparatus of claim 8, wherein said electromagnet acts directly upon said rotor to remove a majority of the weight of said rotor from said mechanical bearings.

10. The apparatus of claim 8, wherein said mechanical bearings are one of ball bearings and roller bearings.

11. The apparatus of claim 8, wherein one of said upper and lower bearings are roller bearings and the other of said upper and lower bearings are ball bearings.

12. The apparatus of claim 8, wherein said electromagnet is energized in response to signals obtained from at least one strain gauge that monitors the amount of weight on said mechanical bearings.

13. The apparatus of claim 1, wherein said flux generating member comprises at least one permanent magnet that induces said flux to flow.

14. The apparatus of claim 1, wherein said flux generating member comprises at least one field coil that induces said flux to flow.

15. The apparatus of claim 14, wherein said at least one field coil comprises a pair of upper and lower field coils, said upper field coil being mounted above said rotor and said lower field coil being mounted below said rotor.

16. The apparatus of claim 15, wherein said rotor further includes a shaft, said apparatus further comprising:

a pair of upper and lower mechanical bearings that said shaft is rotatably mounted within;

an upper bearing coil;

a lower bearing coil; and a control circuit that controls said upper and lower bearing coils such that said flux driven by said upper field coil is varied by a given amount and said flux driven by said lower field coil is inversely varied by said given amount resulting in a change in the net axial force on said rotor.

17. The apparatus of claim 16, wherein said flux driven by said upper field coil is varied by increasing said flux said given amount and said flux driven by said lower field coil is varied by decreasing said flux said given amount resulting in an upward change in said net axial force on said rotor.

18. The apparatus of claim 15, wherein said rotor further includes a shaft, said apparatus further comprising:

a pair of upper and lower mechanical bearings that said shaft is rotatably mounted within; and a control circuit that independently controls said upper and lower field coils such that the net axial force on said rotor is a function of the difference between said flux driven by said upper field coil and said flux driven by said lower field coil.

19. The apparatus of claim 18, wherein said upper and lower field coils are controlled by said control circuit to produce an upward change in said net axial force on said rotor.

20. The apparatus of claim 1, wherein each of said at least one armature coil is an airgap coil being formed of substantially low permeability material.

21. A method for converting between electrical and kinetic energy, said method comprising the steps of:

rotating a solid rotor about an axis, said rotor having a plurality of integral protrusions extending therefrom and forming and axial air gap, said rotor being constructed of substantially magnetic material and having an axial thickness that remains substantially constant or decreases when measured at increasing radial positions;

generating homopolar flux in a member such that said rotor and said flux generating member form a magnetic circuit having a total reluctance that remains substantially constant while said rotor is rotated about said axis; and causing an AC voltage to be induced in at least one airgap armature coil mounted in said axial air gap with the active portion of said armature coil extends to substantially the entire axial length of said protrusion when said rotor is rotated about said axis by exposing said airgap armature coil to said generated flux.

22. The method of claim 21, wherein said step of rotating a solid rotor comprises rotating a rotor formed of a single piece of substantially high permeability material having first and second portions, said first portion being a substantially planar disk and said second portion being a shaft about which said disk portion rotates, said shaft having a radius less than the radially outermost edge of said protrusions.

23. The method of claim 21, wherein said step of generating comprises the step of:

driving at least one field coil with a drive signal to induce said flux to flow.

24. The method of claim 23 further comprising the step of:

monitoring a source of primary power and automatically varying said drive signal to said field coil when said primary power is disrupted.

* * * * *